US012802640B2

(12) United States Patent
Yonebayashi

(10) Patent No.: US 12,802,640 B2
(45) Date of Patent: Nov. 17, 2026

(54) DISPLAY DEVICE, PIXEL CIRCUIT, AND METHOD FOR DRIVING PIXEL CIRCUIT

(71) Applicant: Sharp Display Technology Corporation, Kameyama City (JP)

(72) Inventor: Ryo Yonebayashi, Kameyama City (JP)

(73) Assignee: SHARP DISPLAY TECHNOLOGY CORPORATION, Kameyama City (JP)

( * ) Notice: Subject to any disclaimer, the term of this patent is extended or adjusted under 35 U.S.C. 154(b) by 0 days.

(21) Appl. No.: 19/119,915

(22) PCT Filed: Nov. 30, 2022

(86) PCT No.: PCT/JP2022/044206
§ 371 (c)(1),
(2) Date: Apr. 10, 2025

(87) PCT Pub. No.: WO2024/116334
PCT Pub. Date: Jun. 6, 2024

(65) Prior Publication Data
US 2026/0128009 A1 May 7, 2026

(51) Int. Cl.
*G09G 3/3233* (2016.01)

(52) U.S. Cl.
CPC ... *G09G 3/3233* (2013.01); *G09G 2300/0426* (2013.01); *G09G 2300/043* (2013.01);
(Continued)

(58) Field of Classification Search
CPC ......... G09G 3/3233; G09G 2300/0426; G09G 2300/043; G09G 2300/0819; G09G 2310/08; G09G 2320/0233
See application file for complete search history.

(56) References Cited

U.S. PATENT DOCUMENTS

2007/0120795 A1 5/2007 Uchino et al.
2010/0091041 A1 4/2010 Ono
(Continued)

FOREIGN PATENT DOCUMENTS

CN 114120874 A 3/2022
JP 2004361640 A 12/2004
(Continued)

OTHER PUBLICATIONS

International Search Report, PCT/JP2022/044206, mailed Jan. 31, 2023. (Year: 2023).*
(Continued)

*Primary Examiner* — Julie Anne Watko
(74) *Attorney, Agent, or Firm* — Keating & Bennett, LLP

(57) ABSTRACT

In a pixel circuit 15, a drive transistor T4 has a drain connected to a power supply line ELVDD via a transistor T6, a source connected to an anode of an organic EL element OL via a transistor T5, and a gate connected to a reference voltage line Lref via a transistor T3 and to the source via a capacitor C1. The anode is connected to a data signal line Dj via a transistor T1 and to an initialization voltage line Lini via a transistor T2 and to the source via the capacitor C2. The pixel circuit 15 is driven to sequentially perform initialization of the capacitors C1, C2, detection of a threshold voltage of the drive transistor T4, writing of a voltage according to a data signal D(j) subjected to threshold compensation into the capacitor C1, and lighting of the organic EL element OL according to the written voltage.

12 Claims, 19 Drawing Sheets

(52) U.S. Cl.
CPC . *G09G 2300/0819* (2013.01); *G09G 2310/08* (2013.01); *G09G 2320/0233* (2013.01)

(56) References Cited

U.S. PATENT DOCUMENTS

| | | | | |
|---|---|---|---|---|
| 2017/0193919 | A1 | 7/2017 | Hwang et al. | |
| 2018/0374419 | A1* | 12/2018 | Chen | G09G 3/3233 |
| 2019/0221162 | A1 | 7/2019 | Chen | |
| 2020/0184893 | A1 | 6/2020 | Dong | |
| 2021/0074211 | A1 | 3/2021 | Hu et al. | |
| 2021/0335247 | A1* | 10/2021 | Chen | G09G 3/3241 |
| 2022/0284860 | A1 | 9/2022 | Lin et al. | |
| 2023/0042963 | A1 | 2/2023 | Lin et al. | |

FOREIGN PATENT DOCUMENTS

| | | | |
|---|---|---|---|
| JP | 2020518023 | A | 6/2020 |
| JP | 2021510207 | A | 4/2021 |
| WO | 2008152793 | A1 | 12/2008 |

OTHER PUBLICATIONS

Written Opinion, PCT/JP2022/044206, mailed Jan. 31, 2023. (Year: 2023).*

Preliminary Report on Patentability, PCT/JP2022/044206, mailed May 27, 2025. (Year: 2025).*

* cited by examiner

DISPLAY DEVICE, PIXEL CIRCUIT, AND METHOD FOR DRIVING PIXEL CIRCUIT

TECHNICAL FIELD

The present disclosure relates to a display device, and particularly to a current drive type display device including a display element driven by a current, such as an organic electroluminescence (EL) display device, a pixel circuit used in the display device, and a method for driving the pixel circuit.

BACKGROUND ART

In recent years, an organic EL display device including a pixel circuit provided with an organic EL element (also referred to as an organic light emitting diode (OLED)) has been put into practical use, the organic EL display device being also referred to as an "OLED display device". The pixel circuit of the organic EL display device includes a drive transistor, a write control transistor, a holding capacitor, and the like in addition to the organic EL element. A thin film transistor is used for the drive transistor and the write control transistor, the holding capacitor is connected to a gate terminal of the drive transistor, and a voltage (specifically, a voltage indicating a gradation value of a pixel to be formed in the pixel circuit, and hereinafter referred to as a "data voltage") corresponding to a data signal representing an image to be displayed is applied to the holding capacitor from a drive circuit via a data signal line. The organic EL element is a self-luminous display element that emits light with luminance corresponding to a current flowing through the organic EL element. The drive transistor is provided in series with the organic EL element, and controls a current flowing through the organic EL element in accordance with a voltage held in the holding capacitor.

Variations and shifts occur in the characteristics of the organic EL element and the drive transistor. Therefore, in order to perform high image quality display in the organic EL display device, it is necessary to compensate for variations and shifts in characteristics of these elements. As for the device, method organic EL display a of compensating characteristics of these elements inside a pixel circuit and a method of compensating characteristics of these elements outside the pixel circuit are known. As a pixel circuit corresponding to the former method, there is known a pixel circuit configured to initialize a voltage of a gate terminal of a drive transistor, that is, a voltage held in a holding capacitor, and then charge the holding capacitor with a data voltage via the drive transistor in a diode-connected state. Inside of such a pixel circuit, variations and shifts in the threshold voltage of the drive transistor are compensated for (hereinafter, this compensation for variations and shifts in the threshold voltage is referred to as "threshold compensation").

As an organic EL display device of a system of performing threshold compensation in a pixel circuit (hereinafter referred to as an "internal compensation system"), there is also known an organic EL display device including a pixel circuit that performs internal compensation in a configuration different from a configuration of an organic EL display device using a pixel circuit configured to charge a holding capacitor with a data voltage via a drive transistor in a diode-connected state as described above (hereinafter referred to as an "internal compensation type pixel circuit based on diode connection"). For example, as illustrated in FIG. 20, in a pixel circuit 101 in an organic EL display device described in Patent Document 1, a capacitor C111 corresponding to the holding capacitor is connected between a gate terminal and a source terminal of a drive transistor 111, a capacitor C112 is provided in series with the capacitor C111, and one end of the capacitor C112 is connected to a gate of the drive transistor 111. In the internal compensation type pixel circuit based on diode connection, as described above, after initialization of the holding capacitor, the holding capacitor is charged with the data voltage via the drive transistor in the diode-connection state, and thus, the data voltage subjected to threshold compensation is written in the holding capacitor. On the other hand, in the pixel circuit in the organic EL display device described in Patent Document 1, after the capacitors C111 and C112 are initialized, an operation of holding a threshold voltage Vth of the drive transistor 111 in the capacitor C111 for threshold compensation is performed, and thereafter, a data signal is applied to the other end of the capacitor C112, and thus, a voltage corresponding to the voltage of the data signal is subjected to threshold compensation and written in the capacitor C111.

CITATION LIST

Patent Documents

[Patent Document 1] JP 2004-361640 A
[Patent Document 2] JP 2021-510207 A
[Patent Document 3] WO 2008/152793

SUMMARY

Technical Problem

In the internal compensation type pixel circuit based on the diode connection, threshold compensation of the drive transistor is performed simultaneously when the data voltage is written to the holding capacitor. In the organic EL display device using such a pixel circuit, when a write period is lengthened so that the writing of the data voltage to the pixel circuit is not incomplete, a display defect occurs due to the influence of a data voltage to be written to another pixel circuit in a pixel row different from a pixel row of the pixel circuit. Therefore, the time usable for the threshold compensation performed simultaneously with data writing is limited to the time obtained by subtracting offset time (temporal margin between clock pulses) of a clock signal for the display operation from one horizontal period in the display operation. Meanwhile, in general, a relatively long time is required for threshold compensation operation in an internal compensation type pixel circuit. Therefore, in the organic EL display device using the pixel circuit in which the threshold compensation operation is performed simultaneously with a write operation of the data voltage, when high-speed driving is performed, one horizontal period becomes short, the threshold compensation thus becomes incomplete, and a display quality is likely to deteriorate.

On the other hand, in a pixel circuit in which the threshold compensation operation is separated from the write operation of the data voltage as in the internal compensation type pixel circuit described in Patent Document 1, it is possible to secure time required for the threshold compensation operation even when high-speed driving is performed. In such a pixel circuit, in the write period, the data voltage is applied from a data signal line (DTL101) to two capacitors (see capacitors C111 and C112 in the pixel circuit 101 illustrated in FIG. 20) connected in series with each other, and thus, a voltage to be applied between the gate and the source of the drive transistor (111) in a light emission period is held in one capacitor (C111) of the two capacitors. In such a configuration, when the source terminal of the drive transistor (111) is short-circuited to an anode of the organic EL element (117) in the pixel circuit in order to start a light emission operation, redistribution of charges occurs between the one capacitor (C111) and the parasitic capacitance or the like of the organic EL element (117). As a result, the voltage held in the one capacitor (C111) fluctuates at the start of the light emission operation due to writing of the data voltage, and the display quality may deteriorate.

Therefore, in a current drive type display device such as an organic EL display device of an internal compensation system, it is desired that threshold compensation of a drive transistor is appropriately performed and high display quality is maintained even when high-speed driving is performed.

Solution to Problem

Several embodiments of the present disclosure provide a display device including:

a display portion including a plurality of pixel circuits, a high-voltage power supply line, a low-voltage power supply line, an initialization voltage line for supplying an initialization voltage determined in advance, and a reference voltage line for supplying a reference voltage determined in advance; and a drive circuit configured to drive the plurality of pixel circuits, wherein each of the pixel circuits includes a display element driven by a current, a drive transistor of an N-channel type, a write control switching element, an initialization switching element, a reference voltage supply control switching element, a first light emission control switching element, a second light emission control switching element, a first capacitor, and a second capacitor, the drive transistor has a drain terminal connected to the high-voltage power supply line via the second light emission control switching element, a gate terminal connected to the reference voltage line via the reference voltage supply control switching element, and a source terminal connected to the display element via the first light emission control switching element, the display element has a first terminal connected to the source terminal of the drive transistor via the first light emission control switching element and connected to the initialization voltage line via the initialization switching element, and a second terminal connected to the low-voltage power supply line, the first capacitor has a first electrode connected to the gate terminal of the drive transistor and a second electrode connected to the source terminal of the drive transistor, the second capacitor has a first electrode connected to the source terminal of the drive transistor, and a second electrode connected to the first terminal of the display element and configured to receive a data voltage to be written to the pixel circuit via the write control switching element, each of the pixel circuits is provided with an initialization period, a compensation period, a write period, and a light emission period, and the drive circuit controls ON and OFF of the write control switching element, the initialization switching element, the reference voltage supply control switching element, the first light emission control switching element, and the second light emission control switching element such that in each of the plurality of pixel circuits, in the initialization period, the first capacitor and the second capacitor are initialized such that a voltage for bringing the drive transistor to ON state is held in the first capacitor, in the compensation period, the voltage held in the first capacitor by initialization changes to a threshold voltage of the drive transistor, in the write period, the reference voltage is applied to the first electrode of the first capacitor in which the threshold voltage is held and the data voltage is applied to the second electrode of the second capacitor, so that a voltage corresponding to the data voltage is subjected to threshold compensation of the drive transistor and written to the first capacitor, and in the light emission period, a drive current corresponding to the voltage written to and held in the first capacitor is supplied to the display element.

Several other embodiments of the present disclosure provide a display device based on the above several embodiments, wherein the drive circuit drives the plurality of pixel circuits such that the write period for each of the pixel circuits partially overlaps with the write period for at least one other pixel circuit in which writing of the data voltage is started before the write period for the each of the pixel circuits.

Several embodiments of the present disclosure provide a pixel circuit included in a display portion provided in a display device. The pixel circuit includes a display element driven by a current, a drive transistor of an N-channel type, a write control switching element, an initialization switching element, a reference voltage supply control switching element, a first light emission control switching element, a second light emission control switching element, a first capacitor; and a second capacitor, wherein the display portion further includes a high-voltage power supply line, a low-voltage power supply line, an initialization voltage line for supplying an initialization voltage determined in advance, and a reference voltage line for supplying a reference voltage determined in advance, the drive transistor has a drain terminal connected to the high-voltage power supply line via the second light emission control switching element, a gate terminal connected to the reference voltage line via the reference voltage supply control switching element, and a source terminal connected to the display element via the first light emission control switching element, the display element has a first terminal connected to the source terminal of the drive transistor via the first light emission control switching element and connected to the initialization voltage line via the initialization switching element, and a second terminal connected to the low-voltage power supply line, the first capacitor has a first electrode connected to the gate terminal of the drive transistor and a second electrode connected to the source terminal of the drive transistor, and the second capacitor has a first electrode connected to the source terminal of the drive transistor, and a second electrode connected to the first terminal of the display element and configured to receive a data voltage to be written to the pixel circuit via the write control switching element.

Several embodiments of the present disclosure provide a method for driving a pixel circuit included in a display portion provided in a display device, wherein the pixel circuit includes a display element driven by a current, a drive transistor of an N-channel type, a write control switching element, an initialization switching element, a reference voltage supply control switching element, a first light emission control switching element, a second light emission control switching element, a first capacitor, and a second capacitor, the display portion further includes a high-voltage power supply line, a low-voltage power supply line, an initialization voltage line for supplying an initialization voltage determined in advance, and a reference voltage line for supplying a reference voltage determined in advance, the drive transistor has a drain terminal connected to the high-voltage power supply line via the second light emission control switching element, a gate terminal connected to the reference voltage line via the reference voltage supply control switching element, and a source terminal connected to the display element via the first light emission control switching element, the display element has a first terminal connected to the source terminal of the drive transistor via the first light emission control switching element and connected to the initialization voltage line via the initialization switching element, and a second terminal connected to the low-voltage power supply line, the first capacitor has a first electrode connected to the gate terminal of the drive transistor and a second electrode connected to the source terminal of the drive transistor, the second capacitor has a first electrode connected to the source terminal of the drive transistor, and a second electrode connected to the first terminal of the display element and configured to receive a data voltage to be written to the pixel circuit via the write control switching element, and the method includes:

initializing the first capacitor and the second capacitor such that a voltage for bringing the drive transistor to ON state is held in the first capacitor;

performing a threshold detection by changing the voltage held in the first capacitor as a result of initializing the first capacitor and the second capacitor, to a threshold voltage of the drive transistor;

writing a voltage corresponding to the data voltage to the first capacitor by applying the reference voltage to the first electrode of the first capacitor in which the threshold voltage is held as a result of the threshold detection and applying the data voltage to the second electrode of the second capacitor; and performing a light emission by supplying a drive current corresponding to the voltage written to and held in the first capacitor as a result of writing the voltage corresponding to the data voltage, to the display element.

Effects of the Disclosure

In the display device according to the above several embodiments of the present disclosure, a plurality of pixel circuits, a high-voltage power supply line, a low-voltage power supply line, an initialization voltage line for supplying a initialization voltage determined in advance, and a reference voltage line for supplying a reference voltage determined in advance are included in a display portion, each of the pixel circuits includes a display element driven by a current, a drive transistor of an N-channel type, a write control switching element, an initialization switching element, a reference voltage supply control switching element, a first light emission control switching element, a second light emission control switching element, a first capacitor, and a second capacitor, and is configured as follows. The drive transistor has a drain terminal connected to the high-voltage power supply line via the second light emission control switching element, a gate terminal connected to the reference voltage line via the reference voltage supply control switching element, and a source terminal connected to the display element via the first light emission control switching element. The display element has a first terminal connected to the source terminal of the drive transistor via the first light emission control switching element and connected to the initialization voltage line via the initialization switching element, and a second terminal connected to the low-voltage power supply line. The first capacitor has a first electrode connected to the gate terminal of the drive transistor and a second electrode connected to the source terminal of the drive transistor. The second capacitor has a first electrode connected to the source terminal of the drive transistor, and a second electrode connected to the first terminal of the display element and receives a data voltage to be written to the pixel circuit at the second electrode via the write control switching element.

In each pixel circuit configured as described above, ON OFF of the write control switching element, the and initialization switching element, the reference voltage supply control switching element, the first light emission control switching element, and the second light emission control switching element is controlled by the drive circuit, and thus, each pixel circuit operates as follows in an initialization period, a compensation period, a write period, and a light emission period provided for the each pixel circuit. In the initialization period, the first capacitor and the second capacitor are initialized such that a voltage for bringing the drive transistor to ON state is held in the first capacitor. In the compensation period, the voltage held in the first capacitor by initialization changes to a threshold voltage of the drive transistor. In the write period, a reference voltage is applied to the first electrode of the first capacitor in which the threshold voltage is held, and a data voltage is applied to the second electrode of the second capacitor such that a voltage corresponding to the data voltage is subjected to threshold compensation of the drive transistor and written in the first capacitor. In the light emission period, a drive current corresponding to the voltage written and held in the first capacitor is supplied to the display element, and the display element emits light at a luminance corresponding to the drive current.

As described above, in the organic EL display device using the internal compensation type pixel circuit based on diode connection, the writing of the data voltage to the pixel circuits and the threshold compensation of the drive transistor in the pixel circuit are simultaneously performed. However, in the display device according to the above several embodiments of the present disclosure, as described above, the compensation period in which the threshold compensation of the drive transistor is performed and the write period in which the data voltage is written are separated in each pixel circuit. Therefore, since the compensation period can be set without being restricted by the write period for each pixel circuit, it is possible to appropriately perform threshold compensation in each pixel circuit and suppress deterioration in display quality even when high-speed driving is performed.

In a case where the compensation period and the write period in each pixel circuit are separated as in the display device according to the above several embodiments of the present disclosure, a display defect does not occur even if the write period over a plurality of horizontal periods is provided, unlike a case where an internal compensation type pixel circuit based on diode connection is used. Therefore, in the display device according to the above several other embodiments of the present disclosure, the drive circuit drives the plurality of pixel circuits such that the write period for each pixel circuit partially overlaps with the write period for at least one other pixel circuit in which writing of the data voltage is started before the write period for the each pixel circuit, and thus, the write period over the plurality of horizontal periods is achieved. In the display device according to the above several embodiments of the present disclosure, by incorporating such a configuration, an accurate data voltage can be reliably written in each pixel circuit without lowering a driving frequency. Therefore, high display quality can be reliably maintained while appropriately performing threshold compensation of the drive transistor even when high-speed driving is performed.

Furthermore, in the display device according to the above several embodiments of the present disclosure, since each pixel circuit is configured as described above by using the N-channel drive transistor, unlike a case where a P-channel drive transistor is used, the voltage written to the first capacitor in the write period is not affected by the voltage drop due to the drive current in the high-voltage power supply line. It is therefore possible to avoid occurrence of luminance unevenness due to the voltage drop in a case where the P-channel drive transistor is used.

DESCRIPTION OF EMBODIMENTS

Hereinafter, embodiments will be described with reference to the accompanying drawings. In each transistor mentioned below, a gate terminal corresponds to a control terminal, one of a drain terminal or a source terminal corresponds to a first conduction terminal, and the other corresponds to a second conduction terminal. The transistor in each embodiment is, for example, a thin film transistor, but the present disclosure is not limited to a thin transistor. Furthermore, "connection" in the present description means "electrical connection" unless otherwise specified, and includes not only a case of meaning direct connection but also a case of meaning indirect connection via another element within the scope not departing from the gist of the present disclosure.

1. First Embodiment

<1.1 Overall Configuration>

Figure 1:
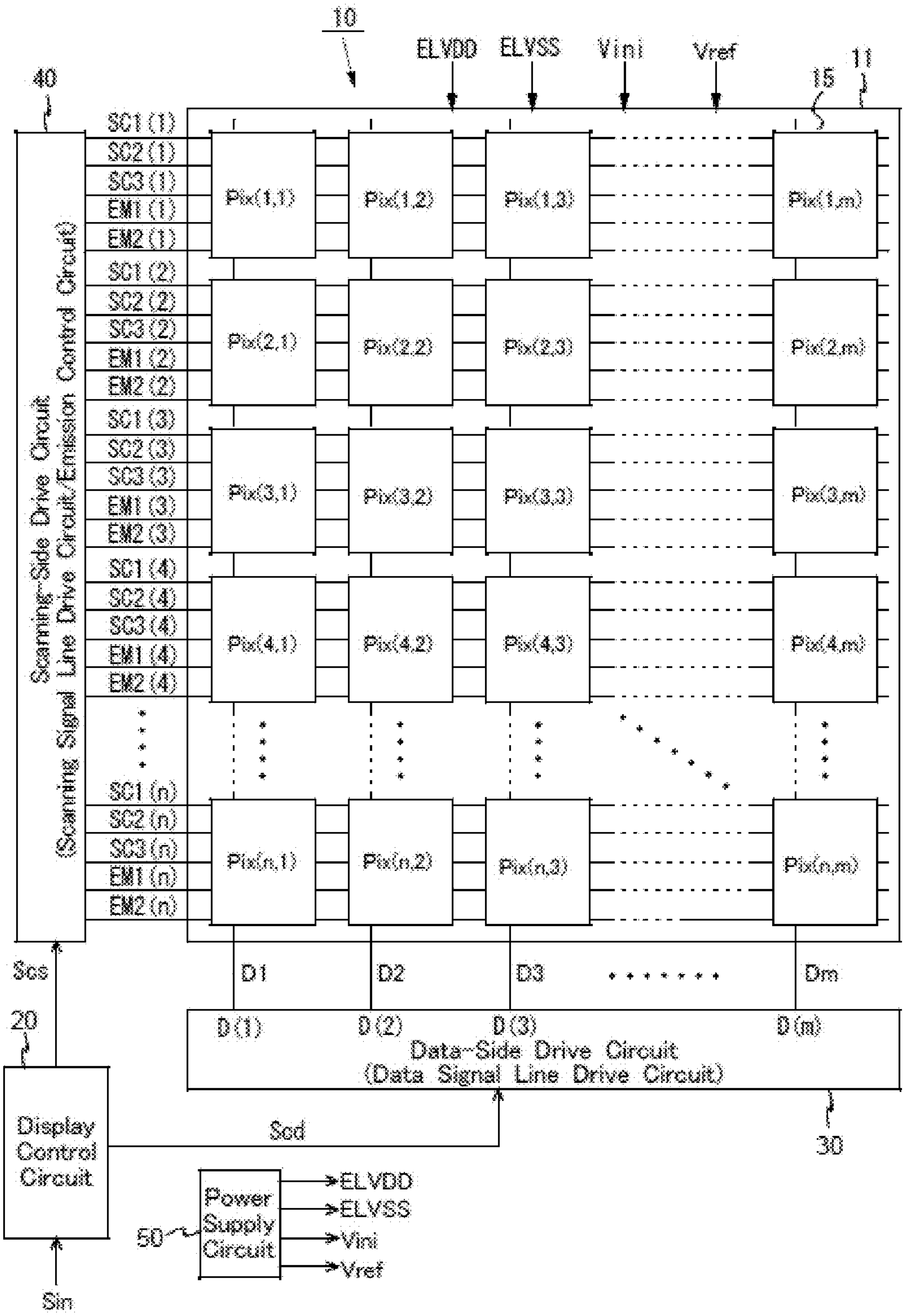
FIG. 1 is a block diagram illustrating an overall configuration of a display device according to a first embodiment.

FIG. 1 is a block diagram illustrating an overall configuration of an organic EL display device 10 according to a first embodiment. The display device 10 is an organic EL display device of an internal compensation system, and is configured such that a voltage corresponding to pixel data is subjected to threshold compensation of a drive transistor and held in each pixel circuit by writing a data voltage as the pixel data in each pixel circuit.

As illustrated in FIG. 1, the display device 10 includes a display portion 11, a display control circuit 20, a data side drive circuit 30, a scanning side drive circuit 40, and a power supply circuit 50. The data side drive circuit 30 functions as a data signal line drive circuit (also referred to as a "data driver"). The scanning side drive circuit 40 functions as a scanning signal line drive circuit (also referred to as a "gate driver") and a light emission control circuit (also referred to as an "emission driver"). In the configuration illustrated in FIG. 1, the two circuits on the scanning side are implemented as one scanning side drive circuit 40, but the two circuits may be appropriately separated, the two circuits may be separately disposed on one side and the other side of the display portion 11. In addition, at least a part of the scanning side drive circuit and the data signal line drive circuit may be integrally formed with the display portion 11. The same applies to the other embodiments described later. The power supply circuit 50 generates a high-level power supply voltage ELVDD, a low-level power supply voltage ELVSS, an initialization voltage Vini, and a reference voltage Vref to be described later to be supplied to the display portion 11, and a power supply voltage (not illustrated) to be supplied to the display control circuit 20, the data side drive circuit 30, and the scanning side drive circuit 40. Details of the initialization voltage Vini and the reference voltage Vref will be described later.

In the display portion 11, m (m is an integer of two or more) data signal lines D1, D2, . . . , and Dm are disposed, and n (n is an integer of two or more) first scanning signal lines SC11, SC12, . . . , and SC1*n*, n second scanning signal lines SC21, SC22, . . . , and SC2*n*, n third scanning signal lines SC31, SC32, . . . and SC3*n*, n first light emission control lines (first emission lines) EM11, EM12, . . . , and EM1*n*, and *n* second light emission control lines (second emission lines) EM21, EM22, . . . and EM2*n* intersecting the data signal lines are further disposed. The display portion 11 is provided with n×m pixel circuits 15 arranged in a matrix along the m data signal lines D1 to Dm and the n first scanning signal lines SC11 to SC1*n*. Each pixel circuit 15 corresponds to one of the m data signal lines D1 to Dm and corresponds to one of the n first scanning signal lines SC11 to SC1*n* (hereinafter, when the pixel circuits 15 are distinguished, the pixel circuit corresponding to an i-th first scanning signal line SC1*i* and a j-th data signal line Dj is referred to as "pixel circuit in an i-th row and a j-th column", and is indicated by reference character "Pix(i, j)"). Each pixel circuit 15 corresponds to one of the n second scanning signal lines SC21 to SC2*n*, corresponds to one of the n third scanning signal lines SC31 to SC3*n*, corresponds to one of the n first light emission control lines EM11 to EM1*n*, and corresponds to one of the n second light emission control lines EM21 to EM2*n*. The data side drive circuit 30 that drives the data signal lines D1 to Dm and the scanning side drive circuit 40 that drives the first scanning signal lines SC11 to SC1*n*, the second scanning signal lines SC21 to SC2*n*, the third scanning signal lines SC31 to SC3*n*, the first light emission control lines EM11 to EM1*n*, and the second light emission control lines EM21 to EM2*n* constitute a drive circuit that drives the n×m pixel circuits 15 in the display portion 11 (see FIG. 1).

In the display portion 11, power supply lines (not illustrated) common to the pixel circuits 15 are disposed. That is, a high-voltage power supply line (indicated by the same symbol "ELVDD" as the high-level power supply voltage) for supplying the high-level power supply voltage ELVDD for driving the organic EL element to be described later, and a low-voltage power supply line (indicated by the same symbol "ELVSS" as the low-level power supply voltage) for supplying the low-level power supply voltage ELVSS for driving the organic EL element are disposed. Specifically, the low-voltage power supply line ELVSS is a cathode common to the plurality of pixel circuits 15. Furthermore, the display portion 11 is provided with an initialization voltage line Lini (not illustrated) for supplying the initialization voltage Vini used for a reset operation (also referred to as an "initialization operation") for initializing each pixel circuit 15, and a reference voltage line Lref (not illustrated) for supplying the reference voltage Vref in an initialization operation and a data write operation to be described later in each pixel circuit 15. The high-level power supply voltage ELVDD, the low-level power supply voltage ELVSS, the initialization voltage Vini, and the reference voltage Vref are supplied from the power supply circuit 50. In the present embodiment, these voltages ELVDD, ELVSS, Vini, and Vref are all fixed voltages, and for example, the high-level power supply voltage ELVDD is 11.5 V, the low-level power supply voltage ELVSS is 3.5 V, the initialization voltage Vini is 0 V, and the reference voltage Vref is 3.5 V.

The display control circuit 20 receives an input signal Sin including image information representing an image to be displayed and timing control information for image display from outside of the display device 10, generates a data side control signal Scd and a scanning side control signal Scs based on the input signal Sin, and outputs the data side control signal Scd to the data side drive circuit (data signal line drive circuit) 30 and the scanning side control signal Scs to the scanning side drive circuit (scanning signal line drive/light emission control circuit) 40.

The data side drive circuit 30 drives the data signal lines D1 to Dm based on the data side control signal Scd from the display control circuit 20. That is, the data side drive circuit 30 outputs m data signals D(1) to D(m) representing images to be displayed in parallel based on the data side control signal Scd, and applies the data signals D(1) to D(m) to the data signal lines D1 to Dm, respectively.

The scanning side drive circuit 40 functions as a scanning signal line drive circuit that drives the n first scanning signal lines SC11 to SC1*n*, the n second scanning signal lines SC21 to SC2*n*, and the n third scanning signal lines SC31 to SC3*n* based on the scanning side control signal Scs from the display control circuit 20, and also functions as a light emission control circuit that drives the n first light emission control lines EM11 to EM1*n* and the n second light emission control lines EM21 to EM2*n*.

Specifically, as the scanning signal line drive circuit, in each frame period, based on the scanning side control signal Scs, the scanning side drive circuit 40 sequentially selects the n first scanning signal lines SC11 to SC1*n* for a predetermined period, sequentially selects the n second scanning signal lines SC21 to SC2*n* for a predetermined period, sequentially selects the n third scanning signal lines SC31 to SC3*n* for a predetermined period, applies an active signal (high-level voltage in the present embodiment) to a selected first scanning signal line SC1*p* (p is an integer satisfying $1 \le p \le n$), a selected second scanning signal line SC2*q* (q is an integer satisfying $1 \le q \le n$), and a selected third scanning signal line SC3*r* (r is an integer satisfying $1 \le r \le n$), and applies an inactive signal (a low-level voltage in the present embodiment) to unselected first scanning signal lines, unselected second scanning signal lines, and unselected third scanning signal lines. By driving the first to third scanning signal lines SC11 to SC1n, SC21 to SC2n, and SC31 to SC3n in such a manner, voltages according to data voltages which are voltages of the corresponding data signal lines D1 to Dm are subjected to threshold compensation described later and are written as pixel data to pixel circuits Pix (p, 1) to Pix(p, m) (hereinafter also referred to as "pixel circuits of the p-th row") corresponding to a selected p-th first scanning signal line SC1p (p=1 to n).

In each frame period, the scanning side drive circuit 40 drives the n first light emission control lines EM11 to EM1n and the n second light emission control lines EM21 to EM2n so as to be selectively deactivated in conjunction with the drive of the first to third scanning signal lines SC11 to SC1n, SC21 to SC2n, and SC31 to SC3n. That is, in each frame period, the scanning side drive circuit 40, as a light emission control circuit, sequentially selects the n first light emission control lines EM11 to EM1n each for a predetermined period based on the scanning side control signal Scs, sequentially selects the n second light emission control lines EM21 to EM2n each for a predetermined period, and applies a light emission control signal (low level voltage in the present embodiment) indicating non-light emission to a selected first light emission control line EM1p (p is an integer satisfying $1 \leq p \leq n$) and a selected second light emission control line EM2q (q is an integer satisfying $1 \leq q \leq n$), and applies a light emission control signal (high-level voltage in the present embodiment) indicating light emission to unselected first light emission control lines and unselected second light emission control lines. While the voltages of the first light emission control line EM1i and the second light emission control line EM2i are both at the high level (activated state), the organic EL elements in the pixel circuits Pix(i, 1) to Pix(i, m) of an i-th row emit light at luminance corresponding to the data voltages written in the pixel circuits Pix(i, 1) to Pix(i, m) of the i-th row, respectively (i=1 to n).

<1.2 Schematic Operation>

Figure 2:
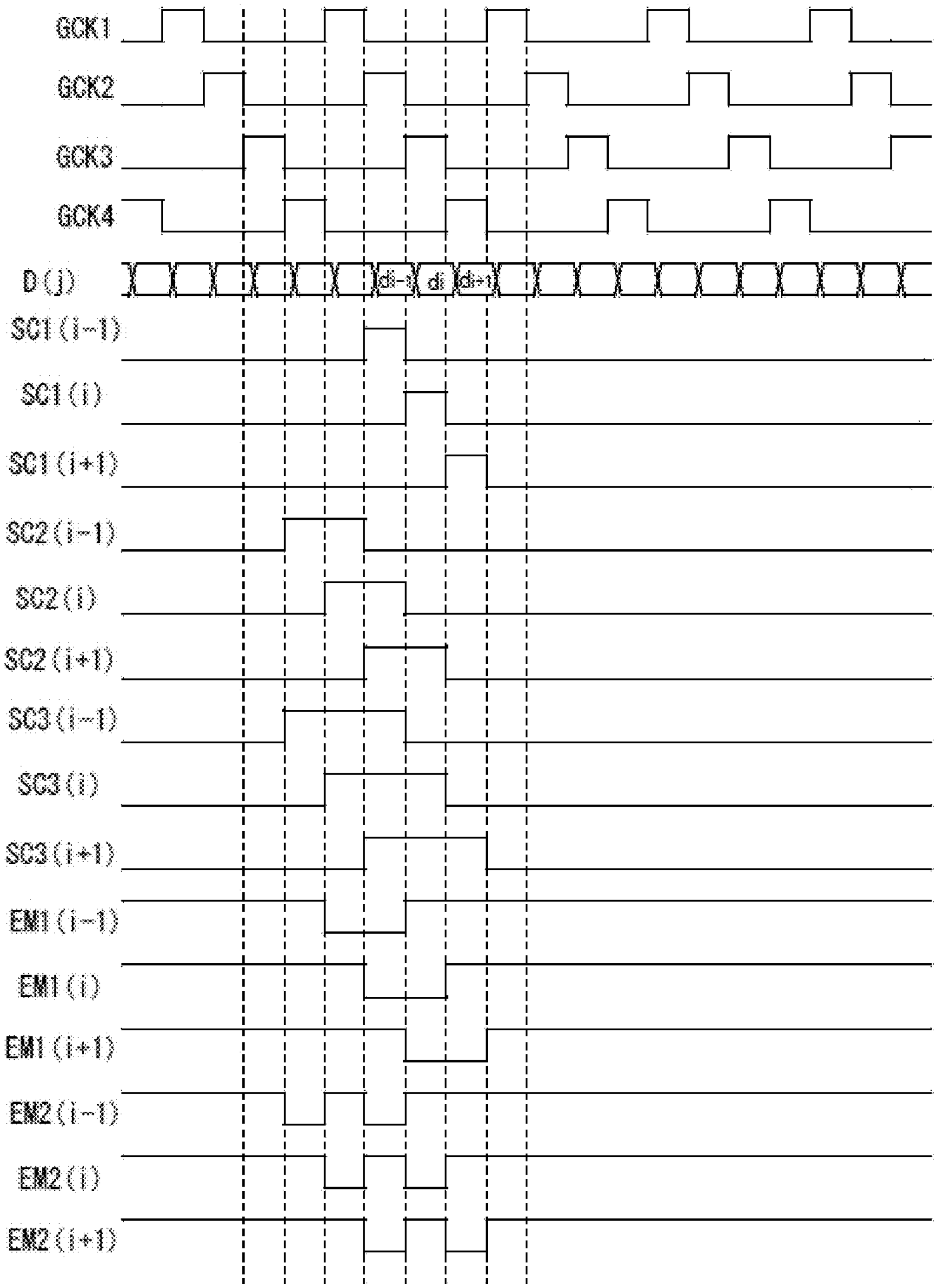
FIG. 2 is a timing chart for describing a schematic operation of the display device according to the first embodiment.

FIG. 2 is a timing chart for describing a schematic operation of the display device 10 according to the present embodiment. The scanning side control signal Scs supplied from the display control circuit 20 to the scanning side drive circuit 40 includes a four-phase clock signal including first to fourth clock signals GCK1 to GCK4 having phases different from each other. The scanning side drive circuit 40 generates first scanning signals SC1(1) to SC1(n), second scanning signals SC2(1) to SC2(n), and third scanning signals SC3(1) to SC3(n) as illustrated in FIG. 2 based on the four-phase clock signal, applies the first scanning signals SC1(1) to SC1(n) to the first scanning signal lines SC11 to SC1n, applies the second scanning signals SC2(1) to SC2(n) to the second scanning signal lines SC21 to SC2n, and applies the third scanning signals SC3(1) to SC3(n) to the third scanning signal lines SC31 to SC3n. The scanning side drive circuit 40 generates first light emission control signals EM1(1) to EM1(n) and second light emission control signals EM2(1) to EM2(n) as illustrated in FIG. 2 based on the four-phase clock signal (first to fourth clock signals GCK1 to GCK4), applies the first light emission control signals EM1(1) to EM1(n) to the first light emission control lines EM11 to EM1n, and applies the second light emission control signals EM2(1) to EM2(n) to the second light emission control lines EM21 to EM2n.

On the other hand, the data side drive circuit 30 generates the data signals D(1) to D(m) that change in conjunction with the first scanning signals SC1(1) to SC1(n) as illustrated in FIG. 2 based on the data side control signal Scd from the display control circuit 20, and applies the data signals D(1) to D(m) to the data signal lines D1 to Dm, respectively. By driving the first scanning signal lines SC11 to SC1n, the second scanning signal lines SC21 to SC2n, the third scanning signal lines SC31 to SC3n, the first light emission control lines EM11 to EM1n, the second light emission control lines EM21 to EM2n, and the data signal lines D1 to Dm in the display portion 11 in this manner, initialization, threshold compensation, and data voltage writing are performed on each pixel circuit Pix(i, j) in a non-light emission period.

As described above, the scanning side drive circuit 40 drives the first scanning signal lines SC11 to SC1n, the second scanning signal lines SC21 to SC2n, the third scanning signal lines SC31 to SC3n, the first light emission control lines EM11 to EM1n, and the second light emission control lines EM21 to EM2n, and the data side drive circuit 30 drives the data signal lines D1 to Dm, with the result that the data voltage based on the image information included in the input signal Sin is written in each pixel circuit 15, and an organic EL element OL in each pixel circuit 15 emits light with luminance corresponding to the data voltage. Thus, the image represented by the image information is displayed on the display portion 11.

<1.3 Configuration and Operation of Pixel Circuit in Present Embodiment>

Figure 3:
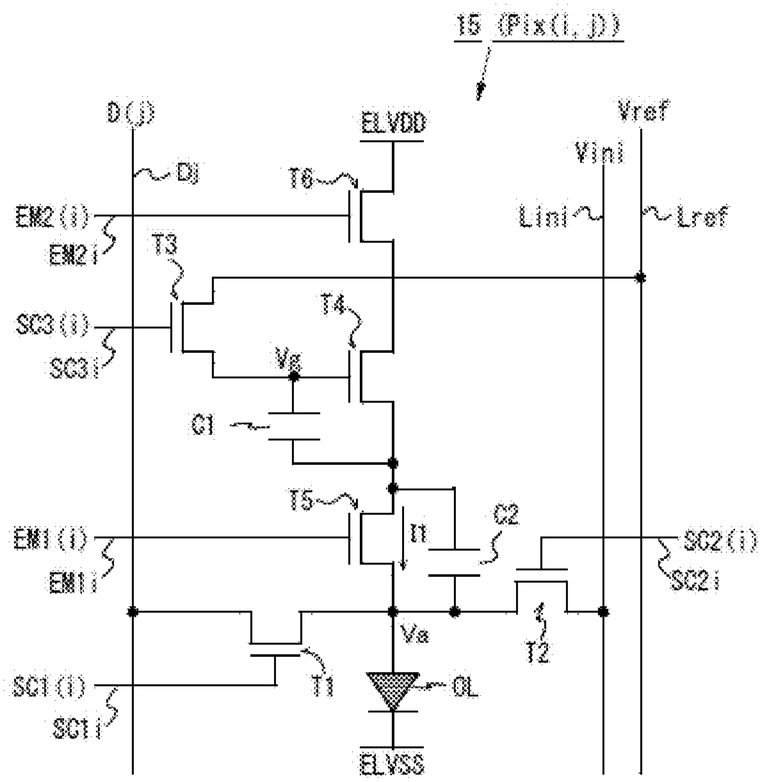
FIG. 3 is a circuit diagram illustrating a configuration of a pixel circuit in the first embodiment.
Figure 4:
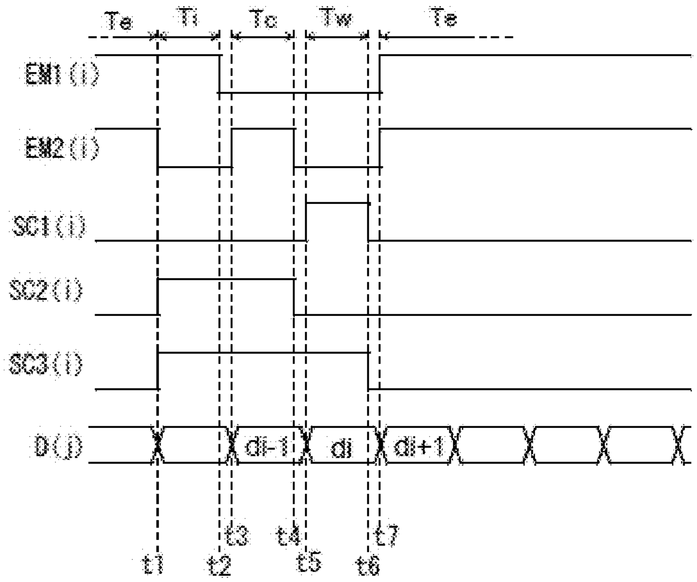
FIG. 4 is a timing chart for describing an operation of the pixel circuit in the first embodiment.

Next, a configuration and an operation of the pixel circuit 15 in the present embodiment will be described with reference to FIGS. 3 and 4. FIG. 3 is a circuit diagram illustrating the configuration of the pixel circuit 15 in the present embodiment. FIG. 4 is a timing chart for describing the operation of the pixel circuit 15 in the present embodiment.

FIG. 3 illustrates a configuration of the pixel circuit 15 corresponding to the i-th first scanning signal line SC1i and the j-th data signal line Dj, that is, the pixel circuit Pix(i, j) in the i-th row and the j-th column in the present embodiment ($1 \leq i \leq n$, $1 \leq j \leq m$). As illustrated in FIG. 3, the pixel circuit 15 includes one organic EL element OL as a display element, transistors (typically thin film six transistors) T1 to T6 (hereinafter referred to as a "write control transistor T1", an "initialization transistor T2", a "reference voltage supply control transistor T3", a "drive transistor T4", a "first light emission control transistor T5", and a "second light emission control transistor T6"), and two capacitors C1 and C2 (hereinafter referred to as a "first capacitor C1" and a "second capacitor C2"). The transistors T1 to T6 are N-channel transistors, and are, for example, thin film transistors (hereinafter referred to as "IGZO-TFTs") in which a channel layer is formed of indium gallium zinc oxide (InGaZnO) as an oxide semiconductor. However, the present disclosure is not limited to such transistors. Each of the first and second capacitors C1 and C2 is a capacitive element including two electrodes (a first electrode and a second electrode). Note that, in the pixel circuit 15, the transistors T1 to T3, T5, and T6 other than the drive transistor T4 function as switching elements. A thin film transistor in which a channel layer is formed of an oxide semiconductor, such as an IGZO-TFT, has a small off-leakage current, and is thus suitable as a switching element in the pixel circuit 15.

As illustrated in FIG. 3, the first scanning signal line (hereinafter also referred to as a "corresponding first scanning signal line" in the description focusing on the pixel circuit) SC1i corresponding to the pixel circuit, a second scanning signal line (hereinafter also referred to as a "corresponding second scanning signal line" in the description focusing on the pixel circuit) SC2*i* corresponding to the pixel circuit, a third scanning (hereinafter also referred to as a "corresponding third scanning signal line" in the description focusing on the pixel circuit) SC3*i* corresponding to the pixel circuit, the first light emission control line (hereinafter also referred to as a "corresponding first light emission control line" in the description focusing on the pixel circuit) EM1*i* corresponding to the pixel circuit, the second light emission control line (hereinafter also referred to as a "corresponding second light emission control line" in the description focusing on the pixel circuit) EM2*i* corresponding to the pixel circuit, the data signal line (hereinafter also referred to as a "corresponding data signal line" in the description focusing on the pixel circuit) Dj corresponding to the pixel circuit, the initialization voltage line Lini, the reference voltage line Lref, the high-voltage power supply line ELVDD, and the low-voltage power supply line ELVSS are connected to the pixel circuit Pix(i, j) in the i-th row and the j-th column in the present embodiment.

As illustrated in FIG. 3, in the pixel circuit 15, the drive transistor T4 has a drain terminal connected to the high-voltage power supply line ELVDD via the second light emission control transistor T6, a source terminal connected to the organic EL element OL via the first light emission control transistor T5, and a gate terminal connected to the reference voltage line Lref via the reference voltage supply control transistor T3. The organic EL element OL has an anode electrode as a first terminal connected to the source terminal of the drive transistor T4 via the first light emission control transistor T5 and connected to the initialization voltage line Lini via the initialization transistor T2, and a cathode electrode as a second terminal connected to the low-voltage power supply line ELVSS. The first capacitor C1 is a capacitive element that should hold a voltage corresponding to a data voltage, and has the first electrode connected to the gate terminal of the drive transistor T4 and the second electrode connected to the source terminal of the drive transistor T4. The second capacitor C2 has the first electrode connected to the source terminal of the drive transistor T4 and the second electrode connected to the anode electrode of the organic EL element OL and connected to the corresponding data signal line Dj via the write control transistor T1.

Figure 5A:
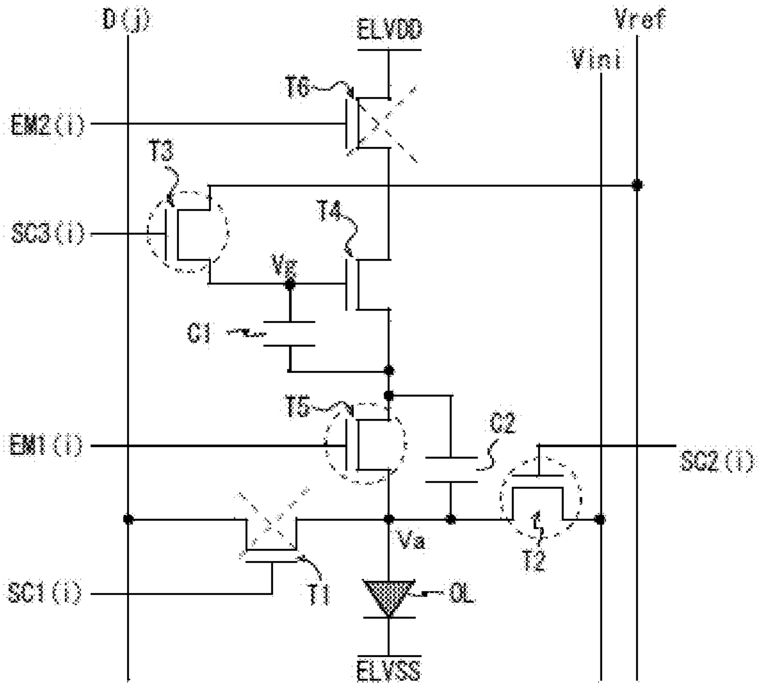
FIG. 5A is a circuit diagram for describing an operation (initialization operation) in an initialization period of the pixel circuit in the first embodiment.
Figure 5B:
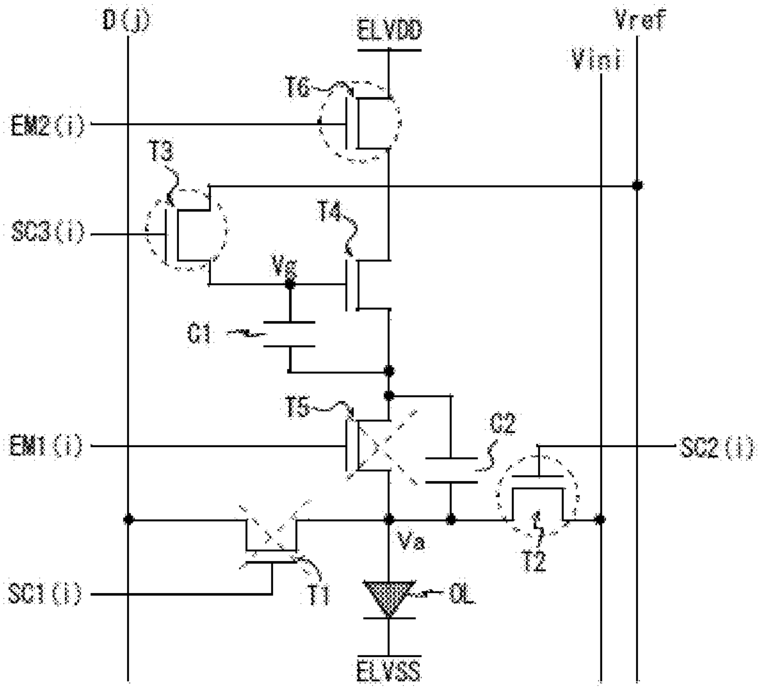
FIG. 5B is a circuit diagram for describing an operation (threshold compensation operation) in a compensation period of the pixel circuit in the first embodiment.
Figure 5C:
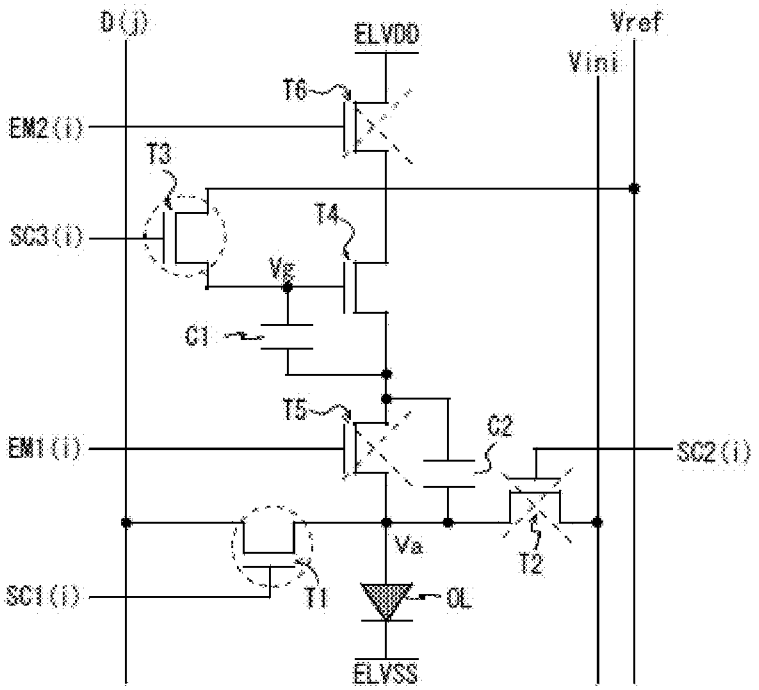
FIG. 5C is a circuit diagram for describing an operation (data write operation) in a write period of the pixel circuit in the first embodiment.
Figure 5D:
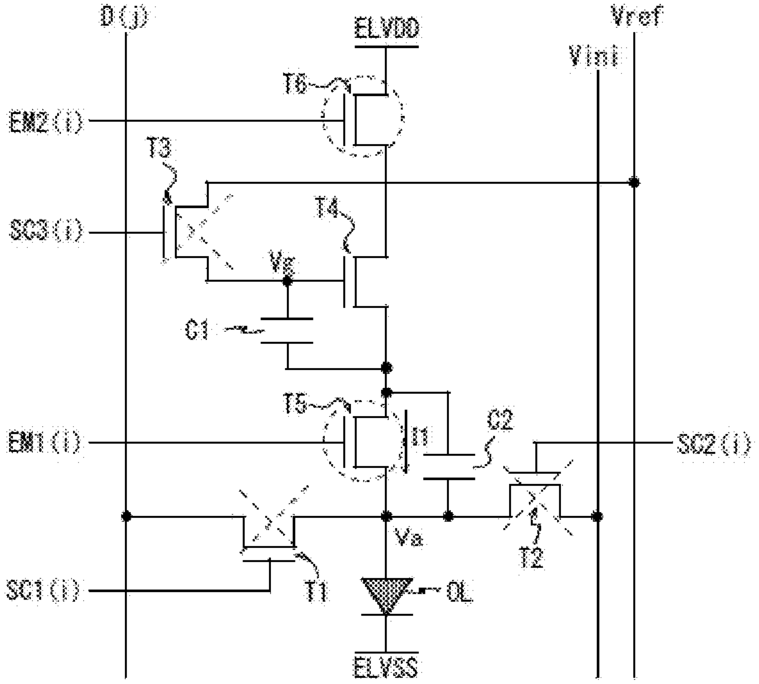
FIG. 5D is a circuit diagram for describing an operation (light emission operation) in a light emission period of the pixel circuit in the first embodiment.

Next, the operation of the pixel circuit 15 illustrated in FIG. 3, that is, the pixel circuit Pix(i, j) in the i-th row and the j-th column in the present embodiment will be described with reference to FIGS. 3, 4, and 5A to 5D. FIG. 4 is a timing chart for describing the operation of the pixel circuit Pix(i, j), and illustrates changes of the drive signals during a period in which the data write operation is performed in the pixel circuit Pix(i, j) and periods before and after the period. In the present embodiment, in each frame period, an initialization period Ti, a compensation period Tc, a write period Tw, and a light emission period Te are sequentially provided for the pixel circuit Pix(i, j). FIG. 5A is a circuit diagram for describing the operation of the pixel circuit Pix(i, j) in the initialization period Ti, that is, the initialization operation. FIG. 5B is a circuit diagram for describing the operation of the pixel circuit Pix(i, j) in the compensation period Tc, that is, the threshold compensation operation. FIG. 5C is a circuit diagram for describing the operation of the pixel circuit Pix(i, j) in the write period Tw, that is, the data write operation. FIG. 5D is a circuit diagram for describing the operation of the pixel circuit Pix(i, j) in the light emission period Te, that is, a light emission operation. In FIGS. 5A to 5D, a dotted circle indicates that a transistor in the circle is in ON state, and a dotted cross indicates that a transistor to which the dotted cross is attached is in OFF state. Such an expression method is also adopted in FIGS. 11A to 11D and FIGS. 17A to 17C described later.

In the present embodiment, the first light emission control line EM1*i*, the second light emission control line EM2*i*, the first scanning signal line SC1*i*, the second scanning signal line SC2*i*, the third light emission control line SC3*i*, and the data signal line Dj are driven as illustrated in FIG. 4, and thus, the pixel circuit 15 in the i-th row and the j-th column, that is, Pix(i, j) in the present embodiment operates as follows.

As illustrated in FIG. 4, immediately before time t1, a first light emission control signal EM1(*i*) supplied via the corresponding first light emission control line EM1*i* and a second light emission control signal EM2(*i*) supplied via the corresponding second light emission control line EM2*i* are at a high level (H level), a first scanning signal SC1(*i*) supplied via the corresponding first scanning signal line SC1*i*, a second scanning signal SC2(*i*) supplied via the corresponding second scanning signal line SC2*i*, and a third scanning signal SC3(*i*) supplied via the corresponding third scanning signal line SC3*i* are at a low level (L level), and the pixel circuit Pix(i, j) is in a light emitting state.

The first light emission control signal EM1(*i*) is at H level at time t1, maintains H level for approximately one horizontal period from time t1, and then changes to L level at time t2. Thereafter, the first light emission control signal EM1(*i*) maintains L level for approximately two horizontal periods, and changes to H level at time t7. On the other hand, the second light emission control signal EM2(*i*) changes from H level to L level at time t1, maintains L level for one horizontal period, then changes to H level at time t3, and maintains H level for approximately one horizontal period. Thereafter, the second light emission control signal EM2(*i*) changes to L level at time t4, maintains L level for approximately one horizontal period, and then changes to H level at time t7. In this way, during the period from time t1 to t7, since one or both of the first light emission control signal EM1(*i*) and the second light emission control signal EM2(*i*) are at L level, one or both of the first light emission control transistor T5 and the second light emission control transistor T6 are in OFF state. Therefore, the pixel circuit Pix(i, j) is in a non-light emitting state during a period from time t1 to t7.

Among the first scanning signal SC1(*i*), the second scanning signal SC2(*i*), and the third scanning signal SC3(*i*) supplied to the pixel circuit Pix(i, j), the first scanning signal SC1(*i*) is at L level at time t1, maintains L level for approximately two horizontal periods from time t1, and then changes to H level at time t5 later than time t4 by offset time. Here, the "offset time" refers to a time margin provided for preventing a malfunction (the same applies hereinafter). Thereafter, the first scanning signal SC1(*i*) maintains H level for approximately one horizontal period, and then changes to L level at time t6 earlier by the offset time than time t7. The second scanning signal SC2(*i*) and the third scanning signal SC3(*i*) change from L level to H level at time t1. The second scanning signal SC2(*i*) maintains H level for approximately two horizontal periods from time t1, and then changes to L level at time t4 earlier than time t5 by the offset time. The third scanning signal SC3(*i*) maintains H level for approximately three horizontal periods from time t1, and then changes to L level at time t6 earlier than time t7 by the offset time.

A period from time t1 to t2 is the initialization period Ti of the pixel circuit Pix(i, j). During the initialization period Ti, as illustrated in FIG. 4, the second light emission control signal EM2(*i*) and the first scanning signal SC1(*i*) are at L level, and the first light emission control signal EM1(*i*), the second scanning signal SC2(*i*), and the third scanning signal SC3(*i*) are at H level. Therefore, as illustrated in FIG. 5A, the second light emission control transistor T6 and the write control transistor T1 are in OFF state, and the first light emission control transistor T5, the initialization transistor T2, and the reference voltage supply control transistor T3 are in ON state. Thus, in the initialization period Ti, the initialization voltage Vini is supplied to the first electrode and the second electrode of the second capacitor C2, the second electrode of the first capacitor C1, and the anode electrode of the organic EL element OL, as well as the reference voltage Vref is supplied to the gate terminal of the drive transistor T4. As a result, the charge accumulated in the second capacitor C2 is discharged, and the voltage across the second capacitor C2 (between the first electrode and the second electrode) is initialized to 0 V. The first capacitor C1 is charged by the reference voltage Vref applied to the first electrode and the initialization voltage Vini applied to the second electrode, and holds a voltage (hereinafter referred to as an "initial holding voltage") Vref-Vini equivalent to a difference between these voltages. The initialization voltage Vini is set to a value slightly lower than the reference voltage Vref, and the initial holding voltage Vref-Vini is set to be larger than a threshold voltage Vth (>0) of the drive transistor T4. In the above-described setting example, Vref=3.5 V and Vini=0 V. In the initialization period Ti, the anode electrode of the organic EL element OL is also initialized by the initialization voltage Vini.

A period from time t3 to t4 is the compensation period Tc of the pixel circuit Pix(i, j). During the compensation period Tc, as illustrated in FIG. 4, the first light emission control signal EM1(*i*) and the first scanning signal SC1(*i*) are at L level, and the second light emission control signal EM2(*i*), the second scanning signal SC2(*i*), and the third scanning signal SC3(*i*) are at H level. Therefore, as illustrated in FIG. 5B, the first light emission control transistor T5 and the write control transistor T1 are in OFF state, and the second light emission control transistor T6, the initialization transistor T2, and the reference voltage supply control transistor T3 are in ON state. At the start time point t3 of the compensation period Tc, a gate-source voltage of the drive transistor T4 is equal to the initial holding voltage Vref-Vini of the first capacitor C1, and is larger than the threshold voltage Vth of the drive transistor T4. Therefore, the drive transistor T4 is in ON state. Thus, the accumulated charge of the first capacitor C1 is discharged via the reference voltage supply control transistor T3, the second light emission control transistor T6, and the drive transistor T4. In response to this discharge, when the holding voltage of the first capacitor C1, that is, the gate-source voltage of the drive transistor T4 decreases to the threshold voltage Vth of the drive transistor T4, the drive transistor T4 goes into OFF state. By such an operation in the compensation period Tc, a voltage equal to the threshold voltage Vth of the drive transistor T4 is held in the first capacitor C1.

A period from time t5 to t6 is the write period Tw of the pixel circuit Pix(i, j). During the write period Tw, as illustrated in FIG. 4, the first light emission control signal EM1(*i*), the second light emission control signal EM2(*i*), and the second scanning signal SC2(*i*) are at L level, and the first scanning signal SC1(*i*) and the third scanning signal SC3(*i*) are at H level. Therefore, as illustrated in FIG. 5C, the first light emission control transistor T5, the second light emission control transistor T6, and the initialization transistor T2 are in OFF state, and the write control transistor T1 and the reference voltage supply control transistor T3 are in ON state. As a result, in the write period Tw, instead of the initialization voltage Vini, the voltage of the data signal line Dj (the voltage of the data signal D(j)) is applied as the data voltage to the second electrode of the second capacitor C2. In the write period Tw, as in the compensation period Tc, the reference voltage Vref is still applied to the first electrode of the first capacitor C1. Since both the first light emission control signal EM1(*i*) and the second light emission control signal EM2(*i*) are at L level immediately before the write period Tw (see FIG. 4), both the first light emission control transistor T5 and the second light emission control transistor T6 are in OFF state, and a voltage equal to the threshold voltage Vth of the drive transistor T4 is held in the second capacitor C2. Therefore, the voltage (hereinafter referred to as a "source voltage") Vs of the source terminal of the drive transistor T4 is Vref-Vth. Here, assume that the source voltage immediately before the data write operation (immediately before the write period Tw) is Vs0, the source voltage immediately after the data write operation (immediately after the write period Tw) is Vs1, and the data voltage that is the voltage of the data signal D(j) supplied to the pixel circuit Pix(i, j) by the data write operation is Vdata. Then, the following equation holds by a charge conservation for a node including a source terminal of the drive transistor T4.

$$C1(Vref - Vs1) + C2(Vdata - Vs1) = C1 \cdot Vth + C2(Vini - Vs0) \quad (1)$$

Substituting Vs0=Vref−Vth into the above equation and rearranging the equation yields the following equation.

$$Vs1 = Vref - Vth + (Vdata - Vini)C2/(C1 + C2) \quad (2)$$

A gate-source voltage Vgs of the drive transistor T4 immediately after the write period Tw is expressed by the following equation from the equation (2).

$$\begin{aligned} Vgs &= Vref - Vs1 \\ &= (Vini - Vdata)C2/(C1 + C2) + Vth \end{aligned} \quad (3)$$

A capacitance value of the first capacitor C1 is set to an appropriate value from the viewpoint of stabilization of the gate-source voltage Vgs of the drive transistor T4, the layout design of the pixel circuit, and the like. From the equation (3), a capacitance value of the second capacitor C2 is preferably larger than the capacitance value of the first capacitor C1, and is set such that, for example, C2/(C1+C2) is about 0.5 to about 0.7.

At the end time point t6 of the write period Tw, both the first scanning signal SC1(*i*) and the third scanning signal SC3(*i*) change from H level to L level, and thus, both the write control transistor T1 and the reference voltage supply control transistor T3 change from ON state to OFF state. At time t7 after a lapse of the offset time from time t6, both the first light emission control signal EM1(*i*) and the second light emission control signal EM2(*i*) change from L level to H level, and thus, both the first light emission control transistor T5 and the second light emission control transistor T6 change from OFF state to ON state. At time t6, the reference voltage supply control transistor T3 is changed to OFF state, and a node including the first electrode of the first capacitor C1 is in a floating state. Therefore, even if the second light emission control transistor T6 changes to ON state at the start time t7 of the light emission operation and the source terminal of the drive transistor T4 is short-circuited to the anode electrode of the organic EL element OL, the holding voltage of the first capacitor C1, that is, the gate-source voltage Vgs of the drive transistor T4 does not change.

The period after time t7 is the light emission period Te of the pixel circuit Pix(i, j), and the light emission period Te continues until the second light emission control signal EM2(*i*) changes from H level to L level in the next frame period. During the light emission period Te, as illustrated in FIG. 4, the first scanning signal SC1(*i*), the second scanning signal SC2(*i*), and the third scanning signal SC3(*i*) are at L level, and the first light emission control signal EM1(*i*) and the second light emission control signal EM2(*i*) are at H level. Thus, as illustrated in FIG. 5D, the write control transistor T1, the initialization transistor T2, and the reference voltage supply control transistor T3 are in OFF state, and the first light emission control transistor T5 and the second light emission control transistor T6 are in ON state. Therefore, in the light emission period Te, a current I1 of an amount corresponding to the voltage held in the first capacitor C1, that is, the gate-source voltage Vgs represented by the equation (3) flows from the high-voltage power supply line ELVDD to the low-voltage power supply line ELVSS via the second light emission control transistor T6, the drive transistor T4, the first light emission control transistor T5, and the organic EL element OL. At this time, the current I1 flowing through the organic EL element OL as a drive current is given by the following equation since the drive transistor T4 operates in a saturation region.

$$I1 = (\beta/2)(Vgs - Vth)^2 \quad (4)$$

$$B = \mu \times (W/L) \times Cox \quad (5)$$

In the equations (4) and (5), Vth, μ, W, L, and Cox represent a threshold voltage, mobility, gate width, gate length, and gate insulating film capacitance per unit area of the drive transistor T4, respectively. Substituting the above equation (3) into the equation (4) yields the following equation.

$$I1 = (\beta/2)\{C2/(C1 + C2)\}\ (Vini - Vdata)^2 \quad (6)$$

From the equation (6), the drive current I1 does not depend on the threshold voltage Vth. Therefore, in the light emission period Te, the organic EL element OL emits light with luminance corresponding to the data voltage Vdata supplied from the corresponding data signal line Dj regardless of the threshold voltage Vth of the drive transistor T4.

<1.4 Effects>

In the present embodiment as described above, unlike an organic EL display device using an internal compensation type pixel circuit based on diode connection, as illustrated in FIG. 4, the compensation period Tc for performing threshold compensation in the pixel circuit 15 and the write period Tw for performing data writing are separated. Therefore, since the compensation period Tc can be set without being restricted by the write period Tw for the pixel circuit 15, it is possible to appropriately perform threshold compensation in the pixel circuit 15 and suppress deterioration in display quality even when high-speed driving is performed.

In the present embodiment, the pixel circuit Pix(i, j) illustrated in FIG. 3 is driven by the drive signals illustrated in FIG. 4, and the compensation period Tc is separated from the write period Tw. However, in the configuration illustrated in FIGS. 3 and 4, as described above, even when the source terminal of the drive transistor T4 is short-circuited to the anode electrode of the organic EL element OL for the start of the light emission operation (see FIG. 5D), the holding voltage of the first capacitor C1 connected between the gate terminal and the source terminal of the drive transistor T4 does not change. Therefore, in the present embodiment, by using an internal compensation type pixel circuit in which the compensation period Tc is separated from the write period Tw instead of the internal compensation type pixel circuit based on diode connection, display quality is not deteriorated.

In general, in a case where a P-channel drive transistor is used in a pixel circuit, since a gate terminal of the drive transistor is connected to a high-voltage power supply line via a holding capacitor, a voltage written to the holding capacitor by a data write operation is affected by a voltage drop due to a drive current in the high-voltage power supply line. However, since the pixel circuit 15 in the present embodiment is configured as illustrated in FIG. 3 by using the N-channel drive transistor T4, the voltage written to the first capacitor C1 corresponding to the holding capacitor in the write period Tw is not affected by the voltage drop due to the drive current in the high-voltage power supply line ELVDD. Therefore, the present embodiment can suppress luminance unevenness caused by the voltage drop in a case where the P-channel drive transistor is used in the pixel circuit.

In a case where the compensation period Tc and the write period Tw for each pixel circuit Pix(i, j) are separated as in the present embodiment, a display defect does not occur even if the write period Tw over a plurality of horizontal periods is provided, unlike a case where an internal compensation type pixel circuit based on diode connection is used. Therefore, in the organic EL display device using the internal compensation type pixel circuit in which the compensation period Tc and the write period Tw are separated from each other, it is preferable to provide the write period Tw over a plurality of horizontal periods when high-speed driving is performed. Therefore, an organic EL display device having such a configuration will be described below as a modification of the first embodiment.

<1.5 Modification of First Embodiment>

In the first embodiment, the n first scanning signal lines SC11 to SC1*n* disposed in the display portion 11 are sequentially selected in each frame period as illustrated in FIG. 2, and in the m pixel circuits Pix (k, 1) to Pix(k, m) corresponding to the selected first scanning signal line SC1*k*, the data write operation as described above is performed with a selection period of the first scanning signal line SC1*k* as the write period Tw (see FIGS. 4 and 5C). As described above, in the first embodiment, in each pixel circuit Pix(i, j), the data write operation is performed in the write period Tw having a length of approximately one horizontal period corresponding to the selection period of the first scanning signal line SC1*i* corresponding to each pixel circuit Pix(i, j). However, in a case where the compensation period Tc and the write period Tw are separated in each pixel circuit Pix(i, j) as in the first embodiment (see FIG. 4), in order to maintain high display quality in high-speed driving, the configuration of the first embodiment can be changed such that the data write operation is performed in the write period Tw over a plurality of horizontal periods. Hereinafter, an organic EL display device having such a modified configuration will be described as a modification of the first embodiment.

An overall configuration of a display device and a configuration of a pixel circuit in the present modification are basically the same as in the first embodiment, and the same or corresponding parts are denoted by the same reference characters and thus will not be described in detail (see FIGS. 1 and 3). In the present modification, the drive signals (hereinafter referred to as "scanning side drive signals") generated by the scanning side drive circuit 40, that is, the first scanning signals SC1(1) to SC1(*n*), the second scanning signals SC2(1) to SC2(*n*), the third scanning signals SC3(1) to SC3(*n*), the first light emission control signals EM1(1) to EM1(*n*), and the second light emission control signals EM2(1) to EM2(*n*) are different from the scanning side drive signals (see FIG. 2) generated by the scanning side drive circuit 40 in the first embodiment. Therefore, hereinafter, the present modification will be described focusing on the scanning side drive signals in the present modification and the operation of the pixel circuit Pix(i, j) based on the scanning side drive signals.

Figure 6:
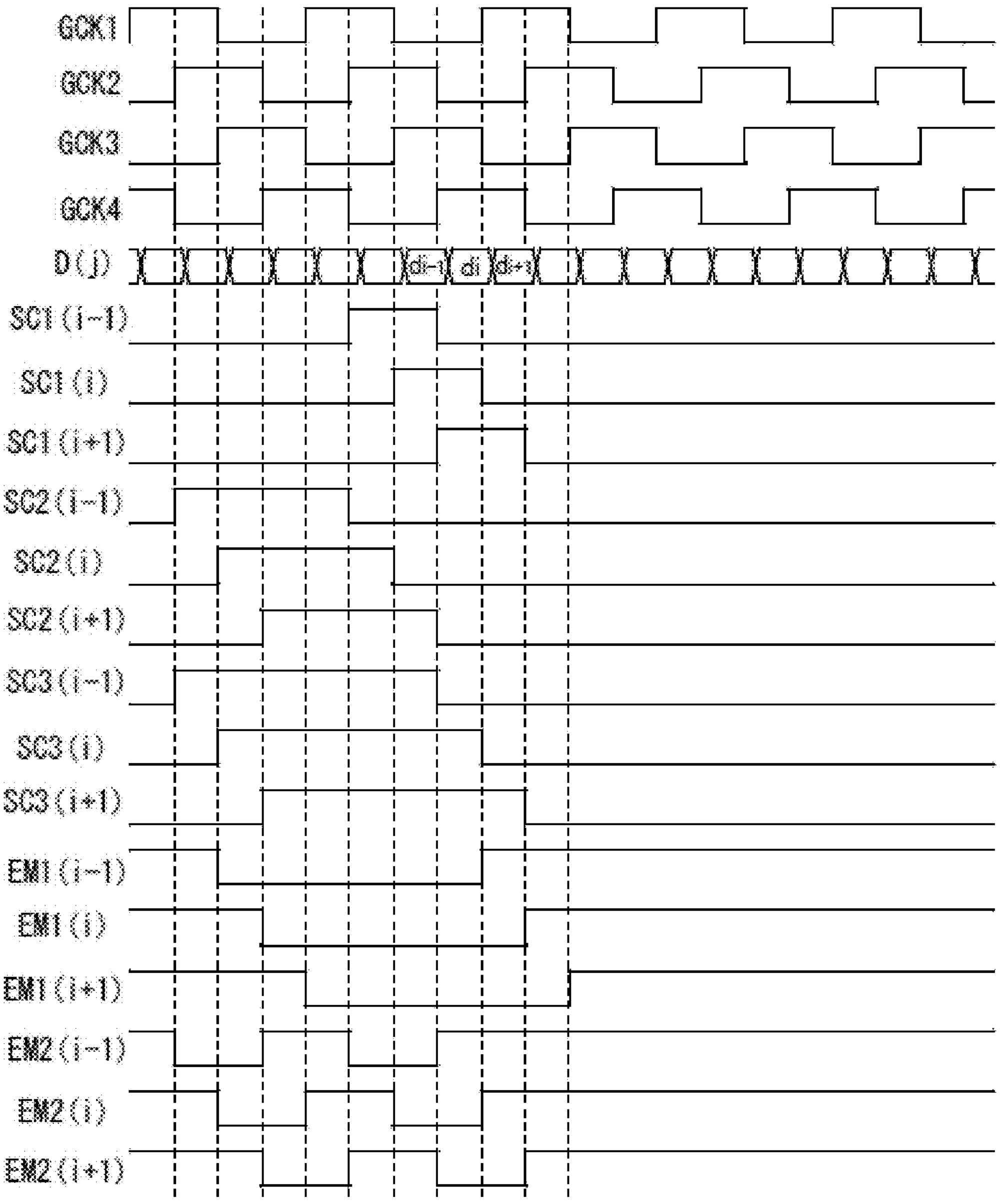
FIG. 6 is a timing chart for describing a schematic operation of a display device according to a modification of the first embodiment.

FIG. 6 is a timing chart for describing a schematic operation of the display device according to the present modification. FIG. 6 illustrates the scanning side drive signals together with the four-phase clock signal (first to fourth clock signals) GCK1 to GCK4 supplied from the display control circuit 20 to the scanning side drive circuit 40 and the data signal D(j) generated by the data side drive circuit 30. As can be seen by comparing FIG. 6 with FIG. 2, a duty ratio of the four-phase clock signal GCK1 to GCK4 are different between the present modification and the first embodiment. That is, in the first embodiment, the four-phase clock signal GCK1 to GCK4 having a duty ratio of ¼ is generated by the display control circuit 20, whereas in the present modification, the four-phase clock signal GCK1 to GCK4 having a duty ratio of ½ is generated by the display control circuit 20 and supplied to the scanning side drive circuit 40 as a part of the scanning side control signal Scs.

In the present modification, based on such a four-phase clock signal (first to fourth clock signals) GCK1 to GCK4, the scanning side drive circuit 40 generates scanning side drive signals, that is, the first scanning signals SC1(1) to SC1(*n*), the second scanning signals SC2(1) to SC2(*n*), the third scanning signals SC3(1) to SC3(*n*), the first light emission control signals EM1(1) to EM1(*n*), and the second light emission control signals EM2(1) to EM2(*n*) as illustrated in FIG. 6 (see FIG. 1). As illustrated in FIG. 6, the length of the period of H level of the first scanning signal SC1(*k*), that is, the selection period of the first scanning signal line SC1*k* is approximately twice the length of the selection period (see FIG. 2) of the first scanning signal line SC1*k* in the first embodiment (k=1 to n). Therefore, the write period Tw in the present modification is twice as long as the write period Tw in the first embodiment. Note that the data signal D(j) in the present modification changes similarly to the data signal D(j) in the first embodiment, and its signal value is switched for each horizontal period (j=1 to m) (see FIGS. 2 and 6).

Figure 7:
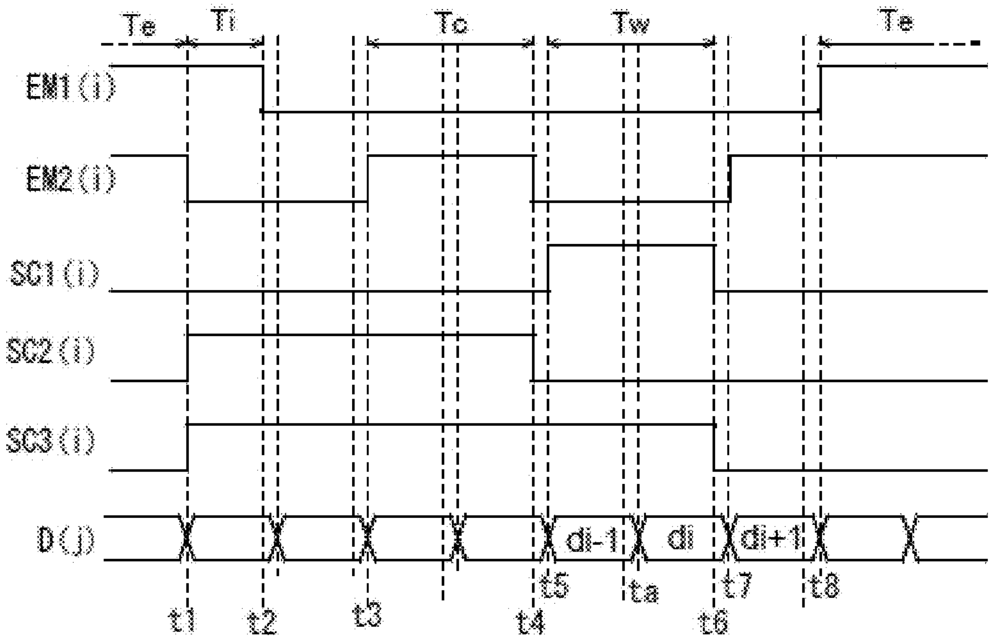
FIG. 7 is a timing chart for describing an operation of the pixel circuit in the modification of the first embodiment.

FIG. 7 is a timing chart for describing the operation of the pixel circuit Pix(i, j) in the i-th row and the j-th column in the present modification, and corresponds to an enlarged view of the drive signals EM1(*i*), EM2(*i*), SC1(*i*) to SC3(*i*) supplied to the pixel circuit Pix(i, j) among the scanning side drive signals illustrated in FIG. 6, and the data signal D(j).

Times t1, t2, t3, t4, t5, and t6 in the timing chart of FIG. 7 correspond to times t1, t2, t3, t4, t5, and t6 in the timing chart of FIG. 4, respectively. The period from time t1 to t2 in the present modification is the initialization period Ti of the pixel circuit Pix(i, j) in FIG. 3, similarly to the period from time t1 to t2 in the first embodiment. The ON/OFF states of the transistors T1 to T3, T5, and T6 in the pixel circuit Pix(i, j) in the initialization period Ti are as illustrated in FIG. 5A. The period from time t3 to t4 in the present modification is the compensation period Tc of the pixel circuit Pix(i, j) in FIG. 3, similarly to the period from time t3 to t4 in the first embodiment. In the compensation period Tc, the ON/OFF states of the transistors T1 to T3, T5, and T6 in the pixel circuit Pix(i, j) are as illustrated in FIG. 5B. Therefore, in the present modification, the pixel circuit Pix(i, j) operates similarly to the first embodiment in the initialization period T1 and the compensation period Tc. However, in the present modification, the length of the compensation period Tc is approximately twice the length of the compensation period Tc in the first embodiment. Therefore, at the end time point t4 of the compensation period Tc, the threshold voltage Vth of the drive transistor T4 is more accurately detected and held in the first capacitor C1.

The period from time t5 to t6 in the present modification is the write period Tw of the pixel circuit Pix(i, j) in FIG. 3, similarly to the period from time t5 to t6 in the first embodiment. The ON/OFF states of the transistors T1 to T3, T5, and T6 in the pixel circuit Pix(i, j) in the write period Tw are as illustrated in FIG. 5C. Therefore, in the present modification, the pixel circuit Pix(i, j) also performs the data write operation in the write period Tw as in the first embodiment. However, in the present modification, the length of the write period Tw is approximately twice the length of the write period Tw in the first embodiment. On the other hand, as illustrated in FIG. 7, the data signal D(j) changes similarly to the data signal D(j) in the first embodiment (see FIG. 4). Therefore, to the pixel circuit Pix(i, j) of the i-th row and the j-th column, in the first half of the write period Tw having a length of approximately two horizontal periods, a voltage di-1 of the data signal D(j) to be written as the data voltage to the pixel circuit Pix(i−1, j) of the (i−1)th row and the j-th column is applied, and in the second half of the write period Tw, a voltage di of the data signal D(j) to be written as the data voltage to the pixel circuit Pix(i, j) of the i-th row and the j-th column is applied. Since the voltage di−1 of the data signal D(j) in the first half of the write period Tw and the voltage di of the data signal D(j) in the second half of the write period Tw indicate the luminance of pixels adjacent to each other, a difference |di−di−1| between the voltages is usually small. Therefore, the supply of the voltage di−1 of the data signal D(j) to the pixel circuit Pix(i, j) in the first half of the write period Tw corresponds to preliminary charge for writing the voltage di of the data signal D(j) to the pixel circuit Pix(i, j) in the second half of the write period Tw. Therefore, in the present modification, by such preliminary charge, a shortage of charge in the write period Tw of the first capacitor C1 that determines the gate-source voltage of the drive transistor T4 can be resolved, and the data voltage di to be written to Pix(i, j) can be more reliably written.

As illustrated in FIG. 7, in the present modification, as in the first embodiment (see FIG. 4), the first scanning signal SC1(*i*) and the third scanning signal SC3(*i*) change from H level to L level at time t6, and the second light emission control signal EM2(*i*) changes from L level to H level at time t7. The first light emission control signal EM1(*i*) is still at L level at time t7, and changes from L level to H level at the subsequent time t8. Therefore, in the present modification, the period after time t8 is the light emission period Te of the pixel circuit Pix(i, j) in FIG. 3, and the light emission period Te continues until the second light emission control signal EM2(*i*) changes from H level to L level in the next frame period. The ON/OFF states of the transistors T1 to T3, T5, and T6 in the pixel circuit Pix(i, j) in the light emission period Te are as illustrated in FIG. 5D similarly to the first embodiment. Therefore, similarly to the first embodiment, the drive current I1 represented by the above equation (6) based on the voltage held in the first capacitor C1 at the end time point t6 of the write period Tw flows from the high-voltage power supply line ELVDD to the low-voltage power supply line ELVSS via the second light emission control transistor T6, the drive transistor T4, the first light emission control transistor T5, and the organic EL element OL.

The display device according to the present modification including the pixel circuits Pix(i, j) (i=1 to n, j=1 to m) operating as described above can reliably write an accurate data voltage in each pixel circuit Pix(i, j) without lowering a driving frequency, as compared with the first embodiment. As a result, even when high-speed driving is performed, high display quality can be reliably maintained while appropriately performing threshold compensation of the drive transistor T4.

Note that such an effect in the present modification is based on a configuration in which "the first scanning signal lines SC11 to SC1*n* are driven such that the length of the write period Tw that is the selection period of the first scanning signal line SC1*i* connected to the pixel circuit Pix(i, j) is approximately two horizontal periods and the write period Tw partially overlaps with another write period Tw that is the selection period of the first scanning signal line SC1*i*-1 immediately before the write period Tw" (see FIG. 6). Here, the first scanning signal lines SC11 to SC1*n* are driven such that the write period Tw of the pixel circuit Pix(i, j) in the i-th row and the j-th column partially overlaps, by one horizontal period, with the write period Tw of the pixel circuit Pix(i−1, j) in the (i−1)th row and the j-th column in which data writing is started earlier. However, the present disclosure is not limited to this configuration, and the first scanning signal lines SC11 to SC1*n* is only required to be driven such that the write period Tw of the pixel circuit Pix(i, j) in the i-th row and the j-th column partially overlaps with at least one write period Tw of the pixel circuit Pix(i−k, j) (k≥1) in the i-kth row and the j-th column in which data writing is started earlier. The same applies to modifications of other embodiments described later (see FIGS. 12, 13, 18, and 19 described later).

2. Second Embodiment

<2.1 Overall Configuration>

Figure 8:
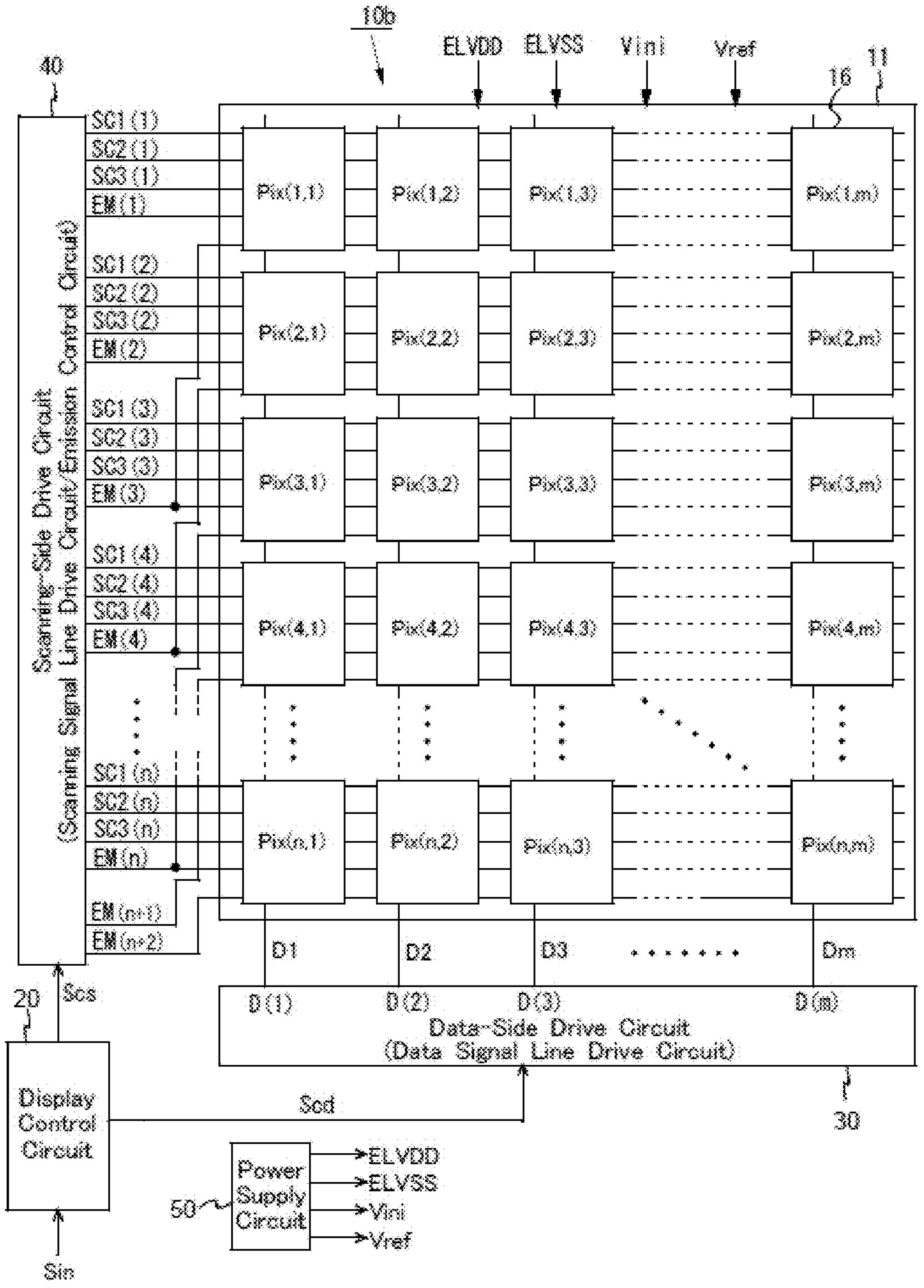
FIG. 8 is a block diagram illustrating an overall configuration of a display device according to a second embodiment.

FIG. 8 is a block diagram illustrating an overall configuration of an organic EL display device 10*b* according to a second embodiment. The display device 10*b* is an organic EL display device of an internal compensation system as in the first embodiment, and is configured such that a voltage corresponding to pixel data is subjected to threshold compensation of a drive transistor and held in each pixel circuit by writing a data voltage as pixel data in each pixel circuit.

As illustrated in FIG. 8, the display device 10*b* has a configuration basically similar to the configuration of the display device 10 (see FIG. 1) according to the first embodiment. Therefore, in the configuration of the display device 10*b* according to the present embodiment, parts that are the same as or correspond to the configuration of the display device 10 according to the first embodiment are denoted by the same reference characters, and will not be described in detail. Hereinafter, parts different from the configuration of the display device 10 according to the first embodiment will be described.

In the first embodiment, as illustrated in FIG. 1, the n first light emission control lines EM11 to EM1*n* and the n second light emission control lines EM21 to EM2*n* are disposed in the display portion 11. However, in the present embodiment, as illustrated in FIG. 8, instead of these two types of light emission control lines EM11 to EM1*n* and EM21 to EM2*n*, one type of light emission control lines EM1 to EMn+X is disposed in the display portion 11, and the i-th light emission control line EMi and the subsequent light emission control line EMi+X subsequent to i-th light emission control line EMi are connected to the pixel circuit Pix(i, j) in the i-th row and the j-th column (X is a positive integer, and X=2 in the example illustrated in FIG. 8). The other signal lines, voltage lines, and power supply lines disposed in the display portion 11 in the present embodiment are the same as the signal lines, voltage lines, and power supply lines disposed in the display portion 11 in the first embodiment.

The display control circuit 20, the data side drive circuit 30, and the power supply circuit 50 in the present embodiment are configured similarly to the display control circuit 20, the data side drive circuit 30, and the power supply circuit 50 in the first embodiment, respectively, and thus will not be described in detail.

The scanning side drive circuit 40 in the present embodiment functions as a scanning signal line drive circuit that drives the n first scanning signal lines SC11 to SC1*n*, the n second scanning signal lines SC21 to SC2*n*, and the n third scanning signal lines SC31 to SC3*n* based on the scanning side control signal Scs from the display control circuit 20, and also functions as a light emission control circuit that drives the n+X light emission control lines EM1 to EMn+X.

Specifically, the scanning side drive circuit 40 in the present embodiment drives, as a scanning signal line drive circuit, the first scanning signal lines SC11 to SC1*n*, the second scanning signal lines SC21 to SC2*n*, and the third scanning signal lines SC31 to SC3*n*, similarly to the scanning side drive circuit 40 in the first embodiment. However, the drive timings of the first scanning signal lines SC11 to SC1*n* and the second scanning signal lines SC21 to SC2*n* are slightly different from the drive timings of the first scanning signal lines SC11 to SC1*n* and the second scanning signal lines SC21 to SC2*n* in the first embodiment (details will be described later). The scanning side drive circuit 40 in the present embodiment drives, as a light emission control circuit, the light emission control lines EM1 to EMn+X similarly to the driving of the first light emission control lines EM11 to EM1*n* in the first embodiment, but the drive timings of the light emission control lines EM1 to EMn+X are slightly different from the drive timings of the first light emission control lines EM11 to EM1*n* (details will be described later).

<2.2 Schematic Operation>

In the present embodiment, as in the first embodiment, the scanning side control signal Scs supplied from the display control circuit 20 to the scanning side drive circuit 40 includes a four-phase clock signal including first to fourth clock signals GCK1 to GCK4 having phases different from each other as illustrated in FIG. 2. As in the first embodiment, the scanning side drive circuit 40 generates first scanning signals SC1(1) to SC1(*n*), second scanning signals SC2(1) to SC2(*n*), and third scanning signals SC3(1) to SC3(*n*) based on the four-phase clock signal, applies the first scanning signals SC1(1) to SC1(*n*) to the first scanning signal lines SC11 to SC1*n*, applies the second scanning signals SC2(1) to SC2(*n*) to the second scanning signal lines SC21 to SC2*n*, and applies the third scanning signals SC3(1) to SC3(*n*) to the third scanning signal lines SC31 to SC3*n*. The waveforms of the first scanning signals SC1(1) to SC1(*n*), the second scanning signals SC2(1) to SC2(*n*), and the third scanning signal lines SC31 to SC3*n* are basically similar to the waveforms (see FIG. 2) of the first scanning signals SC1(1) to SC1(*n*), the second scanning signals SC2(1) to SC2(*n*), and the third scanning signal lines SC31 to SC3*n* in the first embodiment, but specific signal change timings are different (see FIG. 10 to be described later).

In the present embodiment, too, the scanning side drive circuit 40 drives the first scanning signal lines SC11 to SC1*n*, the second scanning signal lines SC21 to SC2*n*, the third scanning signal lines SC31 to SC3*n*, and the light emission control lines EM1 to EMn+X, and the data side drive circuit 30 drives the data signal lines D1 to Dm. Then, the data voltage based on the image information included in the input signal Sin is written in each pixel circuit 16, and an organic EL element OL in each pixel circuit 16 emits light with luminance corresponding to the data voltage. Thus, the image represented by the image information is displayed on the display portion 11.

<2.3 Configuration and Operation of Pixel Circuit in Present Embodiment>

Figure 9:
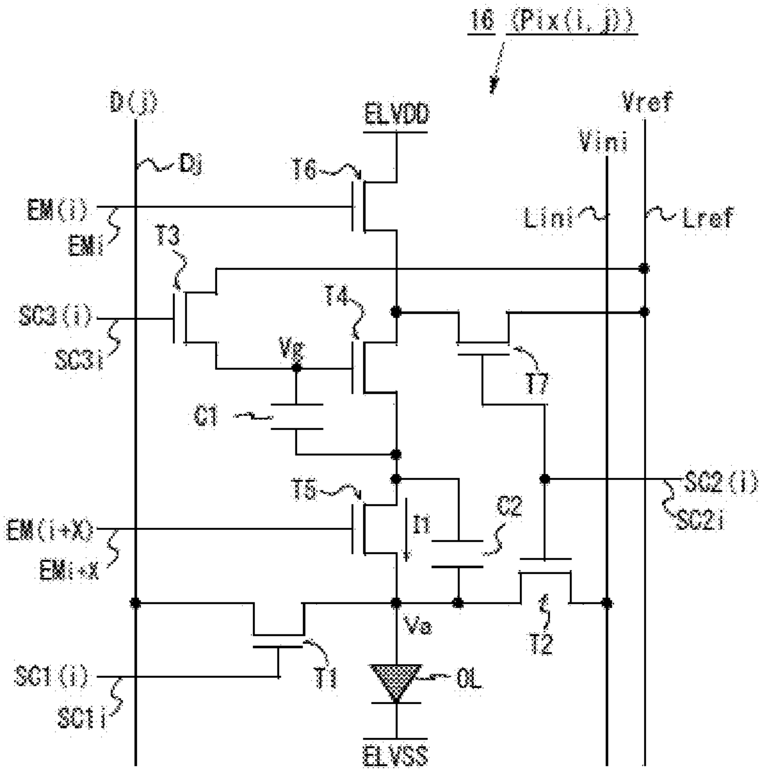
FIG. 9 is a circuit diagram illustrating a configuration of a pixel circuit in the second embodiment.
Figure 10:
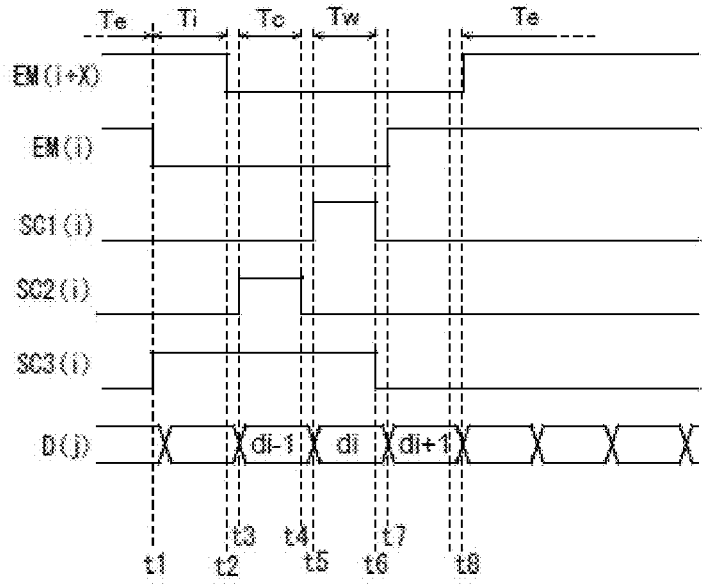
FIG. 10 is a timing chart for describing an operation of the pixel circuit in the second embodiment.

Next, a configuration and an operation of the pixel circuit 16 in the present embodiment will be described with reference to FIGS. 9 and 10. FIG. 9 is a circuit diagram illustrating the configuration of the pixel circuit 16 in the present embodiment. FIG. 10 is a timing chart for describing the operation of the pixel circuit 16 in the present embodiment.

FIG. 9 illustrates a configuration of the pixel circuit 16 corresponding to the i-th first scanning signal line SC1*i* and the j-th data signal line Dj, that is, the pixel circuit Pix(i, j) in the i-th row and the j-th column in the present embodiment (1≤i≤n, 1≤j≤m). Similarly to the pixel circuit 15 (FIG. 3) in the first embodiment, the pixel circuit 16 includes the organic EL element OL as a display element, the write control transistor T1, the initialization transistor T2, the reference voltage supply control transistor T3, the drive transistor T4, the first light emission control transistor T5, the second light emission control transistor T6, the first capacitor C1, and the second capacitor C2, and a connection relationship between these elements is similar to the connection relationship in the pixel circuit 15 in the first embodiment. As illustrated in FIG. 9, the i-th light emission control line EMi, that is, the corresponding light emission control line EMi is connected to the gate terminal of the second light emission control transistor T6, and the light emission control line EMi+X (X is a positive integer) subsequent to the corresponding light emission control line EMi is connected to the gate terminal of the first light emission control transistor T5. In this regard, the present embodiment is different from the first embodiment (see FIG. 3). The signal lines connected to the gate terminals of the transistors T1, T2, and T3 as other switching elements in the pixel circuit 16 are similar to the signal lines in the pixel circuit 15 in the first embodiment.

As illustrated in FIG. 9, the pixel circuit 16 in the present embodiment includes a current supply control transistor T7. In the pixel circuit 16, the drain terminal of the drive transistor T4 is connected to the high-voltage power supply line ELVDD via the second light emission control transistor T6, and is connected to the reference voltage line Lref via the current supply control transistor T7. The current supply control transistor T7 has a gate terminal connected to the i-th second scanning signal line SC2*i*, that is, the corresponding second scanning signal line SC2*i*, and functions as a switching element.

Figure 11A:
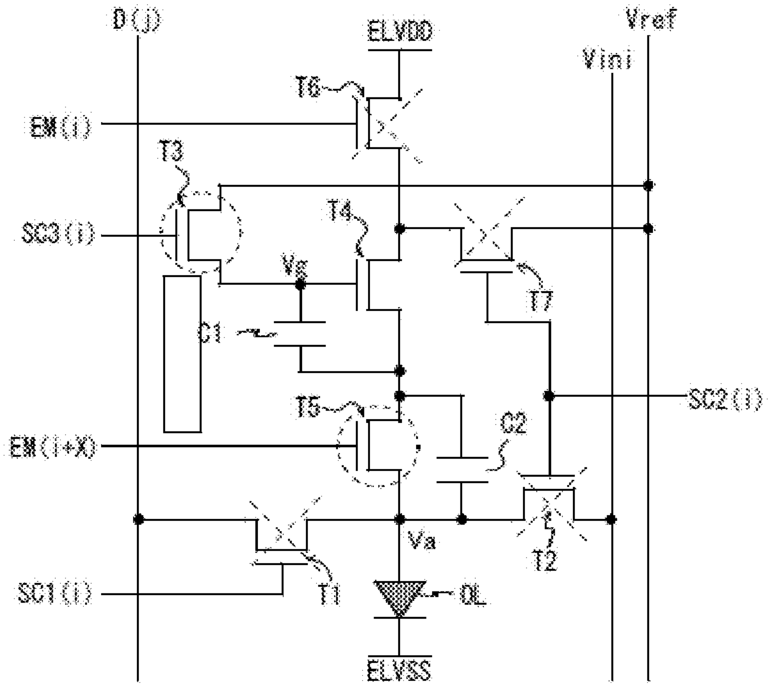
FIG. 11A is a circuit diagram for describing an operation in an initialization period of the pixel circuit in the second embodiment.
Figure 11B:
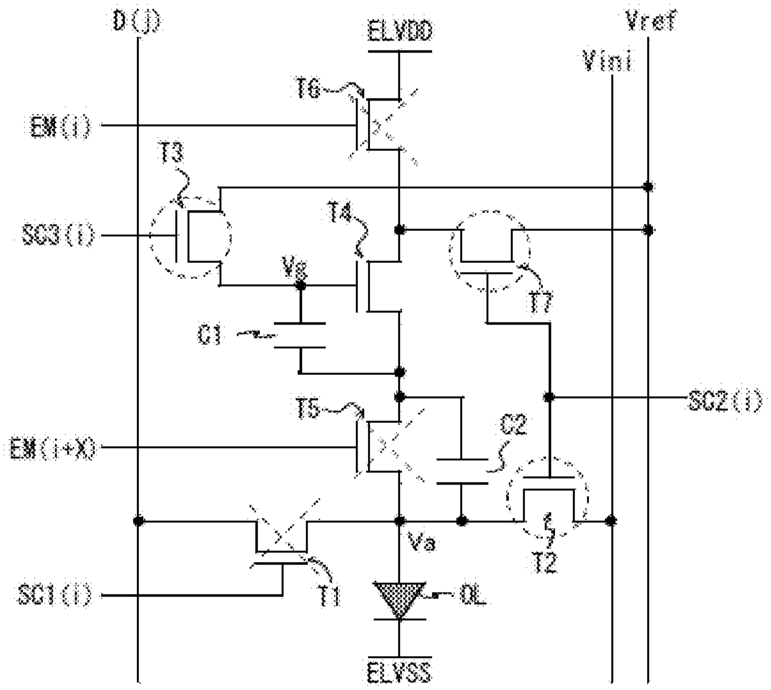
FIG. 11B is a circuit diagram for describing an operation in a compensation period of the pixel circuit in the second embodiment.
Figure 11C:
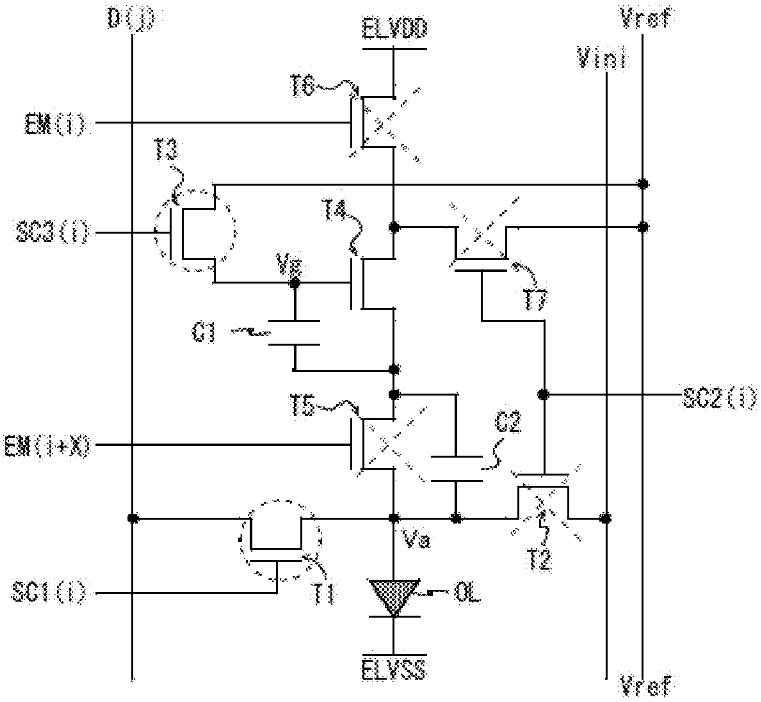
FIG. 11C is a circuit diagram for describing an operation in a write period of the pixel circuit in the second embodiment.
Figure 11D:
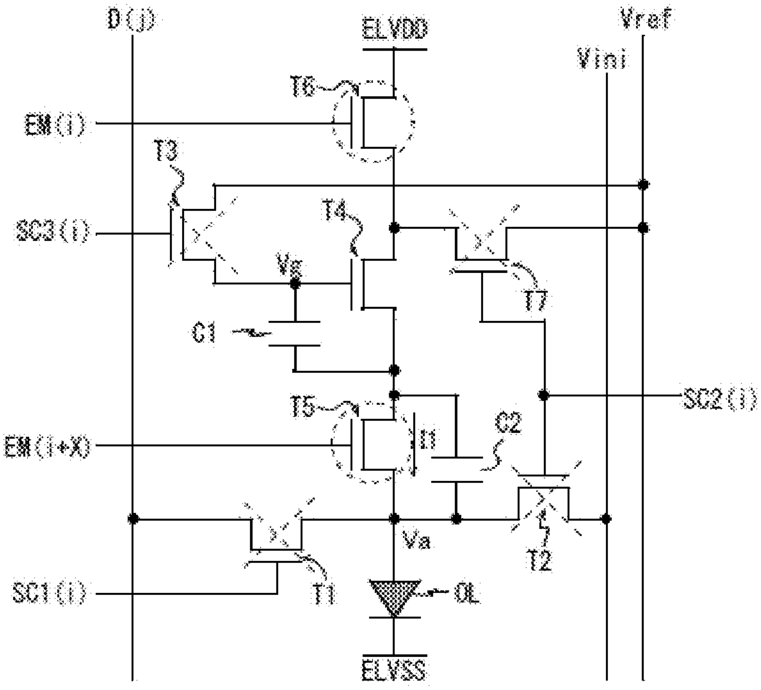
FIG. 11D is a circuit diagram for describing an operation in a light emission period of the pixel circuit in the second embodiment.

Next, the operation of the pixel circuit 16 illustrated in FIG. 9, that is, the pixel circuit Pix(i, j) in the i-th row and the j-th column in the present embodiment will be described with reference to FIGS. 9, 10, and 11A to 11D. FIG. 10 is a timing chart for describing the operation of the pixel circuit Pix(i, j) in the i-th row and the j-th column in the present embodiment, and illustrates changes of the drive signals in a period in which the data write operation is performed in the pixel circuit Pix(i, j) and periods before and after the period. In the present embodiment, too, in each frame period, the initialization period Ti, the compensation period Tc, the write period Tw, and the light emission period Te are sequentially provided for the pixel circuit Pix(i, j). FIG. 11A is a circuit diagram for describing the operation of the pixel circuit Pix(i, j) in the initialization period Ti, that is, the initialization operation, FIG. 11B is a circuit diagram for describing the operation of the pixel circuit Pix(i, j) in the compensation period Tc, that is, the threshold compensation operation, FIG. 11C is a circuit diagram for describing the operation of the pixel circuit Pix(i, j) in the write period Tw, that is, the data write operation, and FIG. 11D is a circuit diagram for describing the operation of the pixel circuit Pix(i, j) in the light emission period Te, that is, a light emission operation.

In the present embodiment, the light emission control lines EMi and EMi+X, the first scanning signal line SC1*i*, the second scanning signal line SC2*i*, the third scanning signal line SC3*i*, and the data signal line Dj are driven as illustrated in FIG. 10, and thus, the pixel circuit Pix(i, j) operates as follows.

As illustrated in FIG. 10, immediately before time t1, the light emission control signal (a signal having a phase different from the phase of the light emission control signal supplied via the light emission control line EMi, and hereinafter, also referred to as a "subsequent light emission control signal") EM(i+X) supplied via the light emission control line EMi+X and the light emission control signal (hereinafter also referred to as "corresponding light emission control signal") EM(i) supplied via the light emission control line EMi are at H level, the first scanning signal SC1(*i*) supplied via the first scanning signal line SC1*i*, the second scanning signal SC2(*i*) supplied via the second scanning signal line SC2*i*, and the third scanning signal SC3(*i*) supplied via the third scanning signal line SC3*i* are at L level, and the pixel circuit Pix(i, j) is in the light emitting state. Note that X=1 in the example illustrated in FIG. 10.

The subsequent light emission control signal EM(i+X) is at H level at time t1, maintains H level until time t2, and changes to L level at time t2. Thereafter, the subsequent light emission control signal EM(i+X) maintains L level for approximately three horizontal periods, and changes to H level at time t8. On the other hand, the corresponding light emission control signal EM(i) changes from H level to L level at time t1, thereafter maintains L level for approximately three horizontal periods, and changes to H level at time t7. In this way, during the period from time t1 to t8, since one or both of the subsequent light emission control signal EM(i+X) and the corresponding light emission control signal EM(i) are at L level, one or both of the first light emission control transistor T5 and the second light emission control transistor T6 are in OFF state. Therefore, the pixel circuit Pix(i, j) is in the non-light emitting state during the period from time t1 to t8.

The first scanning signal SC1($i$) maintains L level until time t5, changes to H level at time t5, then maintains H level for approximately one horizontal period, and changes to L level at time t6 earlier than time t7 by the offset time. The second scanning signal SC2($i$) maintains L level until time t3 later than time t2 by the offset time, changes to H level at time t3, then maintains H level for approximately one horizontal period, and changes to L level at time t4 earlier than time t5 by the offset time. The third scanning signal SC3($i$) changes from L level to H level at time t1, maintains H level for approximately three horizontal periods, and then changes to L level at time t6 earlier than time t7 by the offset time.

The period from time t1 to t2 is the initialization period Ti of the pixel circuit Pix(i, j). During the initialization period Ti, as illustrated in FIG. 10, the corresponding light emission control signal EM(i), the first scanning signal SC1($i$), and the second scanning signal SC2($i$) are at L level, and the subsequent light emission control signal EM(i+X) and the third scanning signal SC3($i$) are at H level. Therefore, as illustrated in FIG. 11A, the second light emission control transistor T6, the write control transistor T1, the initialization transistor T2, and the current supply control transistor T7 are in OFF state, and the first light emission control transistor T5 and the reference voltage supply control transistor T3 are in ON state. As a result, in the initialization period Ti, the voltages of the first electrode and the second electrode of the second capacitor C2 and the second electrode of the first capacitor C1 are equal to the voltage (hereinafter referred to as "anode voltage") Va of the anode electrode of the organic EL element OL, and the reference voltage Vref is supplied to the first electrode of the first capacitor C1. As a result, the charge accumulated in the second capacitor C2 is discharged, and the voltage across the second capacitor C2 (between the first electrode and the second electrode) is initialized to 0 V. The first capacitor C1 is charged by the reference voltage Vref supplied to the first electrode and the anode voltage Va which is the voltage of the second electrode, and holds a voltage (hereinafter referred to as "initial holding voltage") Vref−Va equivalent to a voltage difference between these voltages. The reference voltage Vref is set to a value such that the initial holding voltage Vref-Va is larger than the threshold voltage Vth (>0) of the drive transistor T4, and in the same case as the above setting example in the first embodiment, Vref=3.5 V.

The period from time t3 to t4 is the compensation period Tc of the pixel circuit Pix(i, j). During the compensation period Tc, as illustrated in FIG. 10, the subsequent light emission control signal EM(i+X), the corresponding light emission control signal EM(i), and the first scanning signal SC1($i$) are at L level, and the second scanning signal SC2($i$) and the third scanning signal SC3($i$) are at H level. Therefore, as illustrated in FIG. 11B, the first light emission control transistor T5, the second light emission control transistor T6, and the write control transistor T1 are in OFF state, and the initialization transistor T2, the reference voltage supply control transistor T3, and the current supply control transistor T7 are in ON state. At time t3, the gate-source voltage of the drive transistor T4 is equal to the initial holding voltage Vref−Va of the first capacitor C1, and is larger than the threshold voltage Vth of the drive transistor T4. Therefore, the drive transistor T4 is in ON state. Thus, the accumulated charge of the first capacitor C1 is discharged via the reference voltage supply control transistor T3, the current supply control transistor T7, and the drive transistor T4. In response to this discharge, when the holding voltage of the first capacitor C1, that is, the gate-source voltage of the drive transistor T4 decreases to the threshold voltage Vth of the drive transistor T4, the drive transistor T4 goes into OFF state. By such an operation in the compensation period Tc, a voltage equal to the threshold voltage Vth of the drive transistor T4 is held in the first capacitor C1.

The period from time t5 to t6 is the write period Tw of the pixel circuit Pix(i, j). During the write period Tw, as illustrated in FIG. 10, the subsequent light emission control signal EM(i+X), the corresponding light emission control signal EM(i), and the second scanning signal SC2($i$) are at L level, and the first scanning signal SC1($i$) and the third scanning signal SC3($i$) Therefore, as illustrated in FIG. 11C, the first light emission control transistor T5, the second light emission control transistor T6, the initialization transistor T2, and the current supply control transistor T7 are in OFF state, and the write control transistor T1 and the reference voltage supply control transistor T3 are in ON state. As a result, in the write period Tw, instead of the initialization voltage Vini, the voltage of the data signal line Dj (the voltage of the data signal D(j)) is applied to the second electrode of the second capacitor C2. In the write period Tw, as in the compensation period Tc, the reference voltage Vref is still applied to the first electrode of the first capacitor C1. Immediately before the write period Tw, both the first light emission control transistor T5 and the second light emission control transistor T6 are in OFF state, and a voltage equal to the threshold voltage Vth of the drive transistor T4 is held in the first capacitor C1. Therefore, the voltage (source voltage) Vs of the source terminal of the drive transistor T4 is Vref-Vth. Therefore, in the present embodiment, as in the first embodiment, Vgs of the gate-source voltage of the drive transistor T4 immediately after the write period Tw is represented by the above equation (3).

Thereafter, the corresponding light emission control signal EM(i) changes from L level to H level at time t7, then furthermore, the subsequent light emission control signal EM(i) also changes from L level to H level at time t8, and after time t8, the light emission period Te of the pixel circuit Pix(i, j) is reached. The light emission period Te continues until the corresponding light emission control signal EM(i) changes to L level in the next frame period. During the light emission period Te, as illustrated in FIG. 11D, the write control transistor T1, the initialization transistor T2, the reference voltage supply control transistor T3, and the current supply control transistor T7 are in OFF state, and the first light emission control transistor T5 and the second light emission control transistor T6 are in ON state. Therefore, in the light emission period Te, a current I1 of an amount corresponding to the voltage held in the first capacitor C1, that is, the gate-source voltage Vgs of the drive transistor T4 flows from the high-voltage power supply line ELVDD to the low-voltage power supply line ELVSS via the second light emission control transistor T6, the drive transistor T4, the first light emission control transistor T5, and the organic EL element OL.

Note that the first light emission control transistor T5 changes to ON state at time t8, and thus, the source terminal of the drive transistor T4 to which the second electrode of the first capacitor C1 is connected is short-circuited to the anode electrode of the organic EL element OL. However, since the reference voltage supply control transistor T3 is changed to OFF state at time t6, the node including the first electrode of the first capacitor C1 is in the floating state. Therefore, even when the first light emission control transistor T5 is changed to ON state at time t8, the holding voltage of the first capacitor C1, that is, the gate-source voltage Vgs of the drive transistor T4 does not change. Therefore, in the present embodiment, as in the first embodiment, in the light emission period Te, the gate-source voltage Vgs of the drive transistor T4 is represented by the above equation (3), and the current I1 flowing as the drive current through the organic EL element OL is represented by the above equation (6). From this equation (6), the drive current I1 does not depend on the threshold voltage Vth. Therefore, in the light emission period Te, the organic EL element OL emits light with luminance corresponding to the data voltage Vdata which is the voltage of the data signal D(j) regardless of the threshold voltage Vth of the drive transistor T4.

<2.4 Effects>

In the present embodiment as described above, unlike the known organic EL display device using the internal compensation type pixel circuit based on diode connection, as illustrated in FIG. 10, the compensation period Tc for performing threshold compensation and the write period Tw for performing data writing are separated in the pixel circuit Pix(i, j), so that the same effects as those of the first embodiment can be obtained.

In the present embodiment, in order to discharge the first capacitor C1 in the compensation period Tc, the current supply control transistor T7 is used instead of the second light emission control transistor T6, and the reference voltage line Lref is used instead of the high-voltage power supply line ELVDD. As a result, as compared with the first embodiment, the waveform of the light emission control signal EM(i) is simplified (see FIGS. 4 and 10), and in the compensation period Tc, the threshold compensation operation is performed without being affected by the voltage drop due to the drive current in the high-voltage power supply line ELVDD, and the accurate threshold voltage Vth can be held in the first capacitor C1.

Furthermore, in the present embodiment, unlike the first embodiment in which two types of light emission control lines, that is, the first light emission control lines EM11 to EM1*n* and the second light emission control lines EM21 to EM2*n* are disposed in the display portion 11 as illustrated in FIG. 1, only one type of light emission control lines EM1 to EMn+X is required to be disposed in the display portion 11 as illustrated in FIG. 8. Furthermore, as described above, the waveform of the light emission control signal EM(i) is simplified as compared with the first embodiment (see FIGS. 4 and 10). Therefore, in the present embodiment, as compared with the first embodiment, the configuration of the wiring in the display portion 11 and the scanning side drive circuit 40 is simplified, and the layout design of peripheral circuits of the pixel circuit 16 is facilitated.

<2.5 Modification of Second Embodiment>

In the second embodiment, as in the modification of the first embodiment (see FIGS. 6 and 7), in order to maintain high display quality in high-speed driving, the configuration can be changed such that the data write operation is performed in the write periods Tw over a plurality of horizontal periods. Hereinafter, an organic EL display device having such a modified configuration will be described as a modification of the second embodiment.

An overall configuration of a display device and a configuration of a pixel circuit in the present modification are basically the same as in the second embodiment, and the same or corresponding parts are denoted by the same reference characters and thus will not be described in detail (see FIGS. 8 and 9). In the present modification, the scanning side drive signals generated by the scanning side drive circuit 40, which are the first scanning signals SC1(1) to SC1(*n*), the second scanning signals SC2(1) to SC2(*n*), the third scanning signals SC3(1) to SC3(*n*), and the light emission control signals EM(1) to EM(n+X), are different from the scanning side drive signals (see FIG. 2) generated by the scanning side drive circuit 40 in the second embodiment. Therefore, hereinafter, the present modification will be described focusing on the scanning side drive signals in the present modification and the operation of the pixel circuit Pix(i, j) based on the scanning side drive signals.

Figure 12:
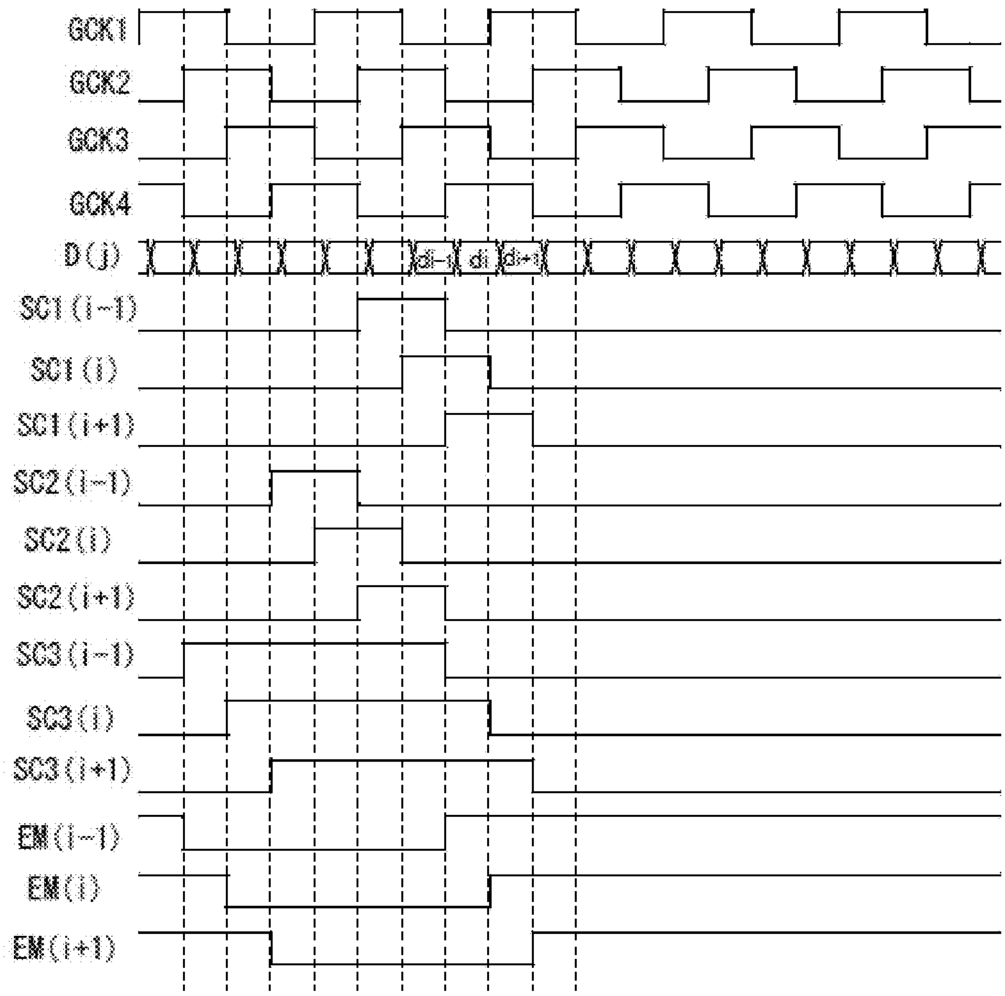
FIG. 12 is a timing chart for describing a schematic operation of a display device according to a modification of the second embodiment.

FIG. 12 is a timing chart for describing a schematic operation of the display device according to the present modification. FIG. 12 illustrates the scanning side drive signals together with the four-phase clock signal (first to fourth clock signals) GCK1 to GCK4 supplied from the display control circuit 20 to the scanning side drive circuit 40 and the data signal D(j) generated by the data side drive circuit 30. In the second embodiment, the four-phase clock signal GCK1 to GCK4 having a duty ratio of ¼ is generated by the display control circuit 20, whereas in the present modification, as illustrated in FIG. 12, the four-phase clock signal GCK1 to GCK4 having a duty ratio of ½ is generated by the display control circuit 20 and supplied to the scanning side drive circuit 40 as a part of the scanning side control signal Scs.

In the present modification, based on such a four-phase clock signal (first to fourth clock signals) GCK1 to GCK4, the scanning side drive circuit 40 generates scanning side drive signals, that is, the first scanning signals SC1(1) to SC1(*n*), the second scanning signals SC2(1) to SC2(*n*), the third scanning signals SC3(1) to SC3(*n*), and the light emission control signals EM(1) to EM(n+X) as illustrated in FIG. 12. As illustrated in FIG. 12, the length of the period of H level of the first scanning signal SC1(*k*), that is, the selection period of the first scanning signal line SC1*k* is approximately twice the length of the selection period of the first scanning signal line SC1*k* in the second embodiment (k=1 to n). Therefore, the write period Tw in the present modification is twice as long as the write period Tw in the second embodiment. Note that the data signal D(j) in the present modification changes similarly to the data signal D(j) in the first embodiment, and its signal value is switched for each horizontal period (j=1 to m) (see FIG. 12).

Figure 13:
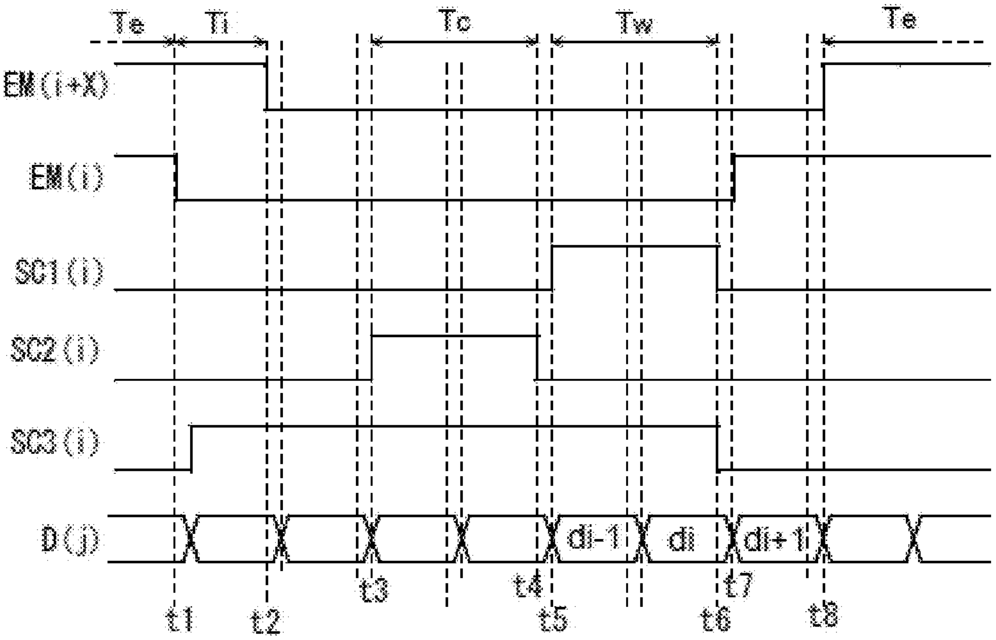
FIG. 13 is a timing chart for describing an operation of the pixel circuit in the modification of the second embodiment.

FIG. 13 is a timing chart for describing the operation of the pixel circuit Pix(i, j) in the i-th row and the j-th column in the present modification, and corresponds to an enlarged view of the drive signals EM(i), EM(i+X), SC1(*i*) to SC3(*i*) supplied to the pixel circuit Pix(i, j) among the scanning side drive signals illustrated in FIG. 12, and the data signal D(j). Note that X=1 in the example illustrated in FIG. 13.

Times t1, t2, t3, t4, t5, t6, t7, and t8 in the timing chart of FIG. 13 correspond to times t1, t2, t3, t4, t5, t6, t7, and t8 in the timing chart of FIG. 10, respectively. The period from time t1 to t2 in the present modification is the initialization period Ti of the pixel circuit Pix(i, j) in FIG. 9, similarly to the period from time t1 to t2 in the second embodiment. The ON/OFF states of the transistors T1 to T3 and T5 to T7 in the pixel circuit Pix(i, j) in the initialization period Ti are as illustrated in FIG. 11A. The period from time t3 to t4 in the present modification is the compensation period Tc of the pixel circuit Pix(i, j) in FIG. 9, similarly to the period from time t3 to t4 in the second embodiment. In the compensation period Tc, the ON/OFF states of the transistors T1 to T3 and T5 to T7 in the pixel circuit Pix(i, j) are as illustrated in FIG. 11B. Therefore, in the present modification, the pixel circuit Pix(i, j) operates similarly to the second embodiment in the initialization period Ti and the compensation period Tc.

However, in the present modification, the length of the compensation period Tc is approximately twice the length of the compensation period Tc in the second embodiment. Therefore, at the end time point t4 of the compensation period Tc, the threshold voltage Vth of the drive transistor T4 is more accurately held in the first capacitor C1.

The period from time t5 to t6 in the present modification is the write period Tw of the pixel circuit Pix(i, j) in FIG. 9, similarly to the period from time t5 to t6 in the second embodiment. The ON/OFF states of the transistors T1 to T3 and T5 to T7 in the pixel circuit Pix(i, j) in the write period Tw are as illustrated in FIG. 11C. Therefore, in the present modification, the pixel circuit Pix(i, j) also performs the data write operation in the write period Tw as in the second embodiment. However, in the present modification, the length of the write period Tw is approximately twice the length of the write period Tw in the second embodiment. On the other hand, as illustrated in FIG. 13, the data signal D(j) changes similarly to the data signal D(j) in the second embodiment, and its signal value is switched for each horizontal period (see FIG. 10). Therefore, to the pixel circuit Pix(i, j) of the i-th row and the j-th column, in the first half of the write period Tw having a length of approximately two horizontal periods, a voltage di−1 of the data signal D(j) to be written as the data voltage to the pixel circuit Pix(i−1, j) in the (i−1)th row and the j-th column is supplied, and in the second half of the write period Tw, a voltage di of the data signal D(j) to be written as the data voltage to the pixel circuit Pix(i, j) in the i-th row and the j-th column is supplied. As a result, in the present modification, as in the modification of the first embodiment, a shortage of charge in the write period Tw of the first capacitor C1 that determines the gate-source voltage of the drive transistor T4 can be resolved, and the data voltage di to be written to Pix(i, j) can be more accurately written.

As illustrated in FIG. 13, in the present modification, as in the second embodiment (see FIG. 10), the first scanning signal SC1(*i*) and the third scanning signal SC3(*i*) change from H level to L level at time t6, the corresponding light emission control signal EM(i) changes from L level to H level at time t7, and then, the subsequent light emission control signal EM(i+X) changes from L level to H level at time t8. Therefore, the period after time t8 is the light emission period Te of the pixel circuit Pix(i, j) in FIG. 9, and the light emission period Te continues until the corresponding light emission control signal EM(i) changes from H level to L level in the next frame period. The ON/OFF states of the transistors T1 to T3 and T5 to T7 in the pixel circuit Pix(i, j) in the light emission period Te are as illustrated in FIG. 11D similarly to the second embodiment. Therefore, similarly to the second embodiment, the drive current I1 represented by the above equation (6) based on the voltage held in the first capacitor C1 at the end time point t6 of the write period Tw flows from the high-voltage power supply line ELVDD to the low-voltage power supply line ELVSS via the second light emission control transistor T6, the drive transistor T4, the first light emission control transistor T5, and the organic EL element OL.

The display device according to the present modification including the pixel circuits Pix(i, j) (i=1 to n, j=1 to m) operating as described above can reliably write an accurate data voltage in each pixel circuit Pix(i, j) without lowering a driving frequency, as compared with the second embodiment. As a result, even when high-speed driving is performed, high display quality can be reliably maintained while appropriately performing threshold compensation of the drive transistor T4.

3. Third Embodiment

<3.1 Overall Configuration>

Figure 14:
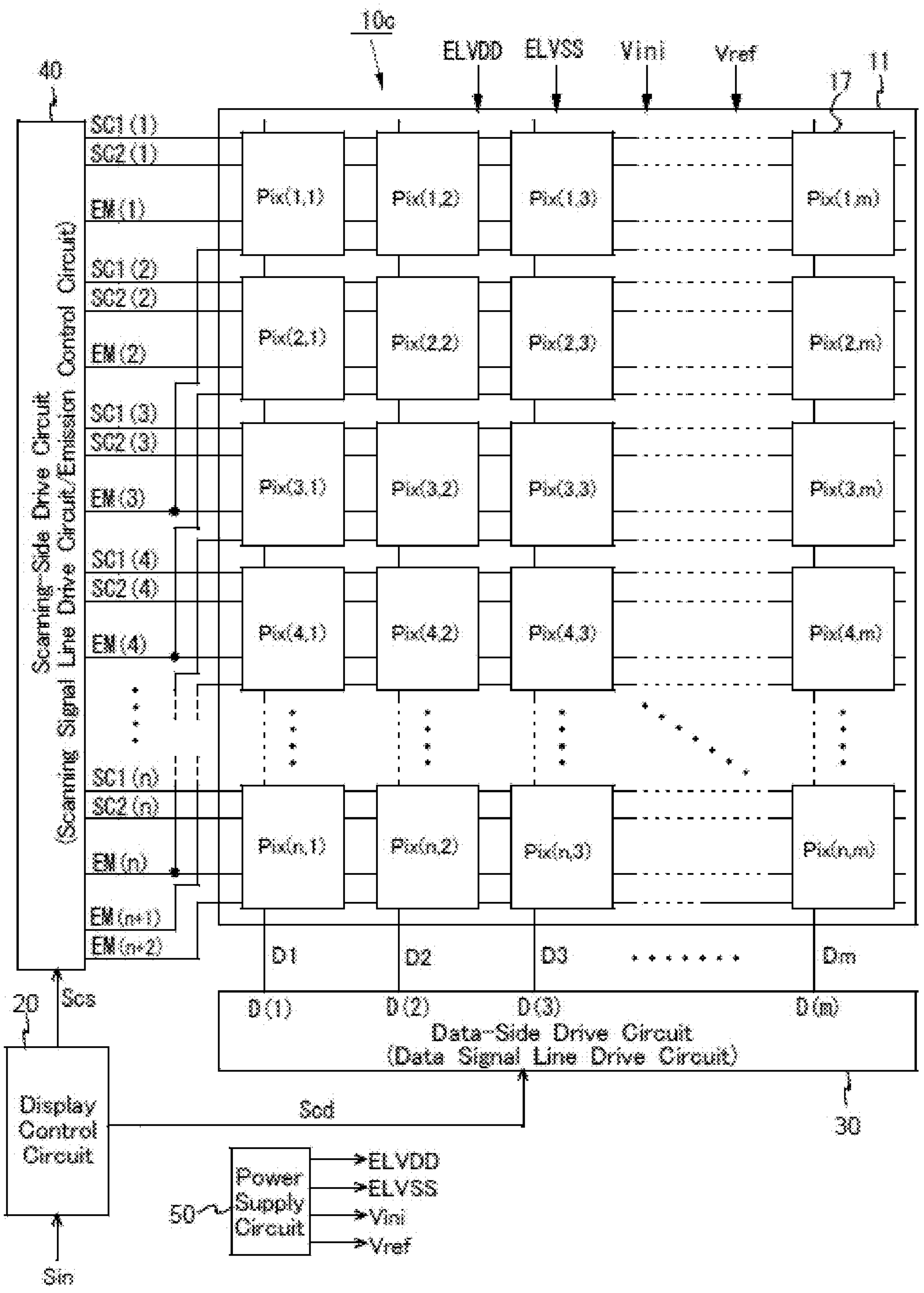
FIG. 14 is a block diagram illustrating an overall configuration of a display device according to a third embodiment.

FIG. 14 is a block diagram illustrating an overall configuration of an organic EL display device 10*c* according to a third embodiment. The display device 10*c* is an organic EL display device of an internal compensation system as in the first embodiment, and is configured such that a voltage corresponding to pixel data is subjected to threshold compensation of a drive transistor and held in each pixel circuit by writing a data voltage as pixel data in the each pixel circuit.

As illustrated in FIG. 14, the display device 10*c* has a configuration basically similar to the configuration of the display device 10 (see FIG. 1) according to the first embodiment. Therefore, in the configuration of the display device 10*c* according to the present embodiment, parts that are the same as or correspond to the configuration of the display device 10 according to the first embodiment are denoted by the same reference characters, and will not be described in detail. Hereinafter, parts different from the configuration of the display device 10 according to the first embodiment will be described.

In the first embodiment, as illustrated in FIG. 1, the n first light emission control lines EM11 to EM1*n* and the n second light emission control lines EM21 to EM2*n* are disposed in the display portion 11. However, in the present embodiment, as illustrated in FIG. 14, instead of these two types of light emission control lines EM11 to EM1*n* and EM21 to EM2*n*, one type of light emission control lines EM1 to EMn+X is disposed in the display portion 11, and the i-th light emission control line EMi and the subsequent light emission control line EMi+X subsequent to i-th light emission control line EMi are connected to the pixel circuit Pix(i, j) in the i-th row and the j-th column (X is a positive integer, and X=2 in the example illustrated in FIG. 14). In the present embodiment, unlike the first embodiment, the display portion 11 is not provided with the third scanning signal lines SC31 to SC3*n*. The other signal lines, voltage lines, and power supply lines disposed in the display portion 11 in the present embodiment are similar to the signal lines, voltage lines, and power supply lines disposed in the display portion 11 in the first embodiment.

The display control circuit 20, the data side drive circuit 30, and the power supply circuit 50 in the present embodiment are configured similarly to the display control circuit 20, the data side drive circuit 30, and the power supply circuit 50 in the first embodiment, respectively, and thus will not be described in detail.

The scanning side drive circuit 40 in the present embodiment functions as a scanning signal line drive circuit that drives the n first scanning signal lines SC11 to SC1*n*, and the n second scanning signal lines SC21 to SC2*n* based on the scanning side control signal Scs from the display control circuit 20, and also functions as a light emission control circuit that drives the n+X light emission control lines EM1 to EMn+X.

The scanning side drive circuit 40 in the present embodiment drives, as a scanning signal line drive circuit, the first scanning signal lines SC11 to SC1*n*, and the second scanning signal lines SC21 to SC2*n*, similarly to the scanning side drive circuit 40 in the first embodiment. The scanning side drive circuit 40 in the present embodiment drives, as a light emission control circuit, the light emission control lines EM1 to EMn+X similarly to the driving of the first light emission control lines EM11 to EM1*n* in the first embodiment. However, each light emission control line EMi is different from the first light emission control lines EM11 to EM1*n* in the first embodiment in that each light emission control line EMi is in an activated state when the voltage is at L level and is in a deactivated state when the voltage is at H level. The drive timings of the light emission control lines EMI to EMn+X are slightly different from the drive timings of the first light emission control lines EM11 to EM1*n* in the first embodiment (details will be described later).

<3.2 Schematic Operation>

In the present embodiment, as in the first embodiment, the scanning side control signal Scs supplied from the display control circuit 20 to the scanning side drive circuit 40 includes a four-phase clock signal including first to fourth clock signals GCK1 to GCK4 having phases different from each other as illustrated in FIG. 2. As in the first embodiment, the scanning side drive circuit 40 generates first scanning signals SC1(1) to SC1(*n*) and second scanning signals SC2(1) to SC2(*n*) based on the four-phase clock signal, applies the first scanning signals SC1(1) to SC1(*n*) to the first scanning signal lines SC11 to SC1*n*, and applies the second scanning signals SC2(1) to SC2(*n*) to the second scanning signal lines SC21 to SC2*n*. The waveforms of the first scanning signals SC1(1) to SC1(*n*) and the second scanning signals SC2(1) to SC2(*n*) are similar to the waveforms of the first scanning signals SC1(1) to SC1(*n*) and the second scanning signals SC2(1) to SC2(*n*) in the first embodiment (see FIG. 2).

In the present embodiment, too, the scanning side drive circuit 40 drives the first scanning signal lines SC11 to SC1*n*, the second scanning signal lines SC21 to SC2*n*, and the light emission control lines EM1 to EMn+X, and the data side drive circuit 30 drives the data signal lines D1 to Dm. Then, the data voltage based on the image information included in the input signal Sin is written in each pixel circuit 17, and an organic EL element OL in each pixel circuit 16 emits light with luminance corresponding to the data voltage. Thus, the image represented by the image information is displayed on the display portion 11.

<3.3 Configuration and Operation of Pixel Circuit in Present Embodiment>

Figure 15:
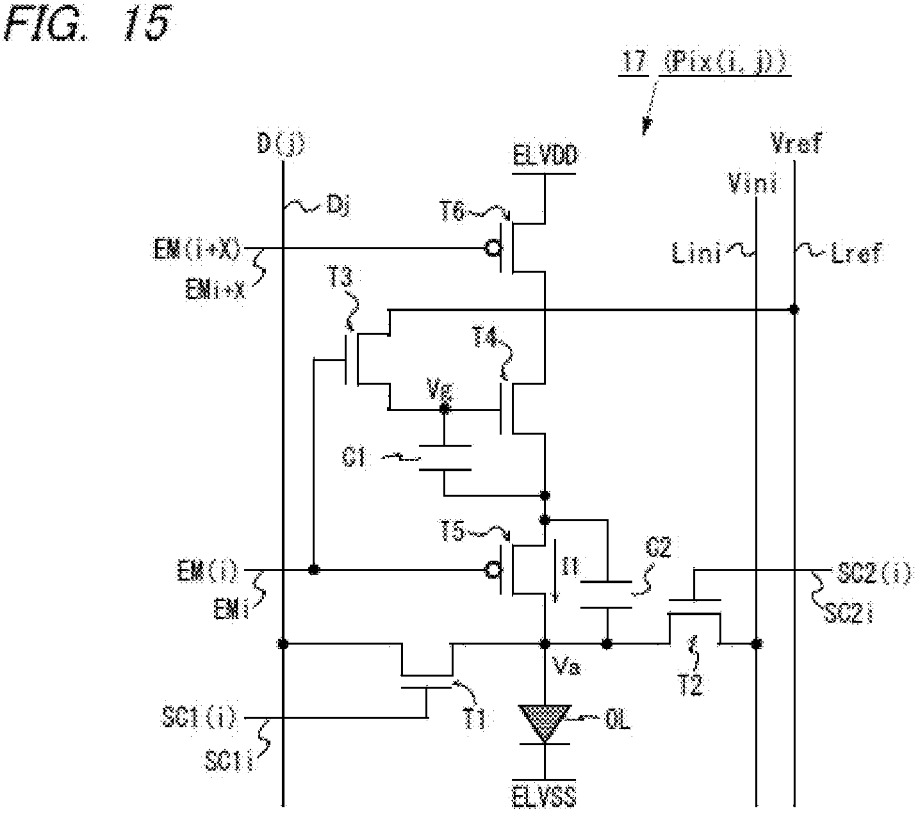
FIG. 15 is a circuit diagram illustrating a configuration of a pixel circuit in the third embodiment.
Figure 16:
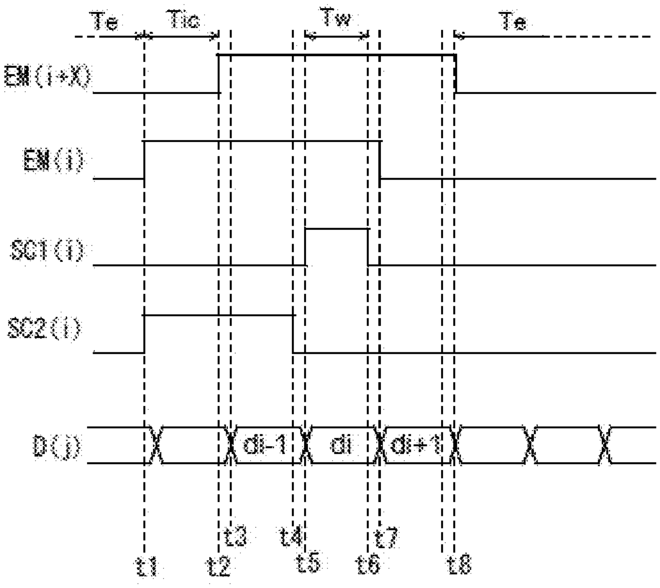
FIG. 16 is a timing chart for describing an operation of the pixel circuit in the third embodiment.

Next, a configuration and an operation of the pixel circuit 17 in the present embodiment will be described with reference to FIGS. 15 and 16. FIG. 15 is a circuit diagram illustrating the configuration of the pixel circuit 17 in the present embodiment. FIG. 16 is a timing chart for describing the operation of the pixel circuit 17 in the present embodiment.

FIG. 15 illustrates a configuration of the pixel circuit 17 corresponding to the i-th first scanning signal line SC1*i* and the j-th data signal line Dj, that is, the pixel circuit Pix(i, j) in the i-th row and the j-th column in the present embodiment (1≤i≤n, 1≤j≤m). Similarly to the pixel circuit 15 (FIG. 3) in the first embodiment, the pixel circuit 17 includes the organic EL element OL as a display element, the write control transistor T1, the initialization transistor T2, the reference voltage supply control transistor T3, the drive transistor T4, the first light emission control transistor T5, the second light emission control transistor T6, the first capacitor C1, and the second capacitor C2, and a connection relationship between these elements is similar to the connection relationship in the pixel circuit 15 in the first embodiment. As illustrated in FIG. 15, both the first light emission control transistor T5 and the second light emission control transistor T6 are P-channel transistors, which are different from the pixel circuit 15 in the first embodiment in this point. The i-th light emission control line EMi, that is, the corresponding light emission control line EMi is connected to the gate terminals of the first light emission control transistor T5 and the reference voltage supply control transistor T3, and the light emission control line EMi+X (X is a positive integer) subsequent to the corresponding light emission control line EMi is connected to the gate terminal of the second light emission control transistor T6. In this regard, too, the present embodiment is different from the first embodiment (see FIG. 3). The signal lines connected to the gate terminals of the transistors T1 and T2 as other switching elements in the pixel circuit 17 are the same as the signal lines in the pixel circuit 15 in the first embodiment. Note that the P-channel transistor used as the first light emission control transistor T5 and the second light emission control transistor T6 is, for example, a thin film transistor (hereinafter referred to as "LTPS-TFT") in which a channel layer is formed of low-temperature polysilicon. Since low-temperature polysilicon has high mobility, when an LTPS-TFT is used as a switching element, on-resistance is lowered. However, the transistor that can be used as the first light emission control transistor T5 and the second light emission control transistor T6 in the pixel circuit 17 is not limited to the LTPS-TFT.

Figure 17A:
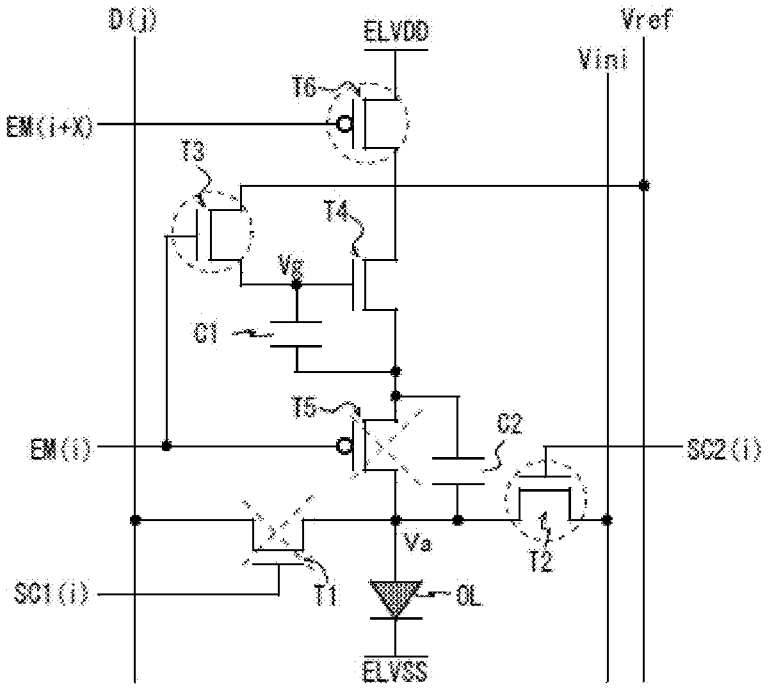
FIG. 17A is a circuit diagram for describing an operation in an initialization/compensation period of the pixel circuit in the third embodiment.
Figure 17B:
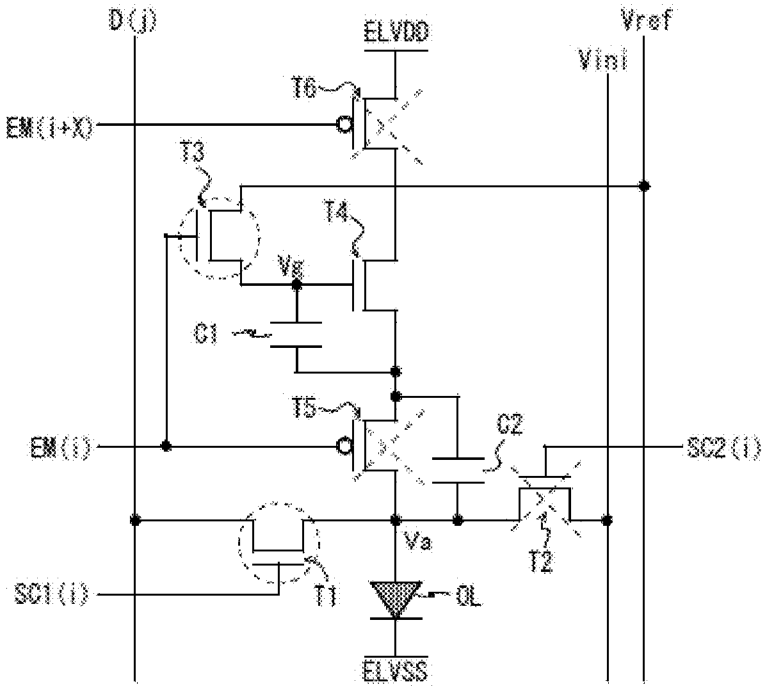
FIG. 17B is a circuit diagram for describing an operation in a write period of the pixel circuit in the third embodiment.
Figure 17C:
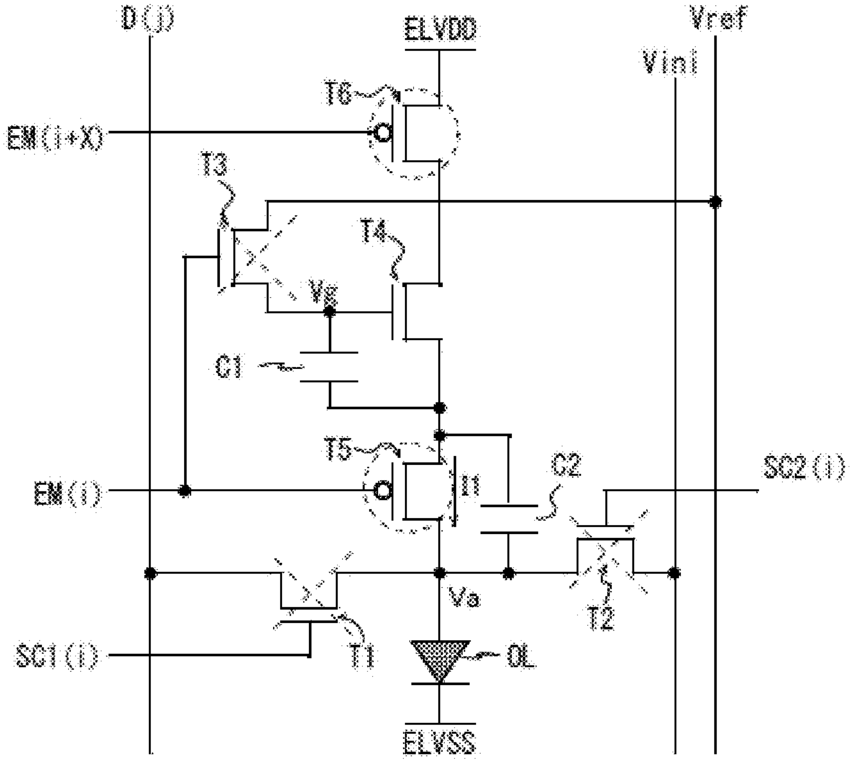
FIG. 17C is a circuit diagram for describing an operation in a light emission period of the pixel circuit in the third embodiment.

Next, the operation of the pixel circuit 17 illustrated in FIG. 15, that is, the pixel circuit Pix(i, j) in the i-th row and the j-th column in the present embodiment will be described with reference to FIG. 15, FIG. 16, and FIGS. 17A to 17C. FIG. 16 is a timing chart for describing the operation of the pixel circuit Pix(i, j) in the i-th row and the j-th column in the present embodiment, and illustrates changes of the drive signals in a period in which the data write operation is performed in the pixel circuit Pix(i, j) and periods before and after the period. In the present embodiment, too, in each frame period, the initialization period Ti, the compensation period Tc, the write period Tw, and the light emission period Te are sequentially provided for the pixel circuit Pix(i, j), but the initialization operation and the threshold compensation operation are continuously performed. Therefore, the initialization period T1 and the compensation period Tc are integrated as the initialization/compensation period Tic. FIG. 17A is a circuit diagram for describing the operation of the pixel circuit Pix(i, j) in the initialization/compensation period Tic, FIG. 17B is a circuit diagram for describing the operation of the pixel circuit Pix(i, j) in the write period Tw, that is, the data write operation, and FIG. 17C is a circuit diagram for describing the operation of the pixel circuit Pix(i, j) in the light emission period Te, that is, the light emission operation.

In the present embodiment, the light emission control lines EMi and EMi+X, the first scanning signal line SC1*i*, the second scanning signal line SC2*i*, and the data signal line Dj are driven as illustrated in FIG. 16, and thus, the pixel circuit Pix(i, j) operates as follows.

As illustrated in FIG. 16, immediately before time t1, the subsequent light emission control signal EM(i+X) that is a light emission control signal supplied via the light emission control line EMi+X and the corresponding light emission control signal EM(i) that is a light emission control signal supplied via the light emission control line EMi are at L level, and the first scanning signal SC1(*i*) supplied via the first scanning signal line SC1*i* and the second scanning signal SC2(*i*) supplied via the second scanning signal line SC2*i* are also at L level. Therefore, immediately before time t1, the P-channel first light emission control transistor T5 and the second light emission control transistor T6 are in ON state, the N-channel write control transistor T1, the initialization transistor T2, and the reference voltage supply control transistor T3 are in OFF state, and the pixel circuit Pix(i, j) is in the light emitting state. Note that X=1 in the example illustrated in FIG. 16.

The subsequent light emission control signal EM(i+X) maintains L level until time t2 after a lapse of one horizontal period from time t1, changes to H level at time t2, then maintains H level for approximately three horizontal periods, and changes to L level at time t8. On the other hand, the corresponding light emission control signal EM(i) changes to H level at time t1, thereafter maintains H level for approximately three horizontal periods, and changes to L level at time t7. In this way, during the period from time t1 to t8, since one or both of the subsequent light emission control signal EM1(*i*+X) and the corresponding light emission control signal EM(i) are at L level, one or both of the first light emission control transistor T5 and the second light emission control transistor T6 are in OFF state. Therefore, the pixel circuit Pix(i, j) is in the non-light emitting state during the period from time t1 to t8.

The first scanning signal SC1(*i*) maintains L level until time t5 after a lapse of approximately two horizontal periods from t1, changes to H level at time t5, then maintains H level for approximately one horizontal period, and changes to L level at time t6 earlier than time t7 by the offset time. The second scanning signal SC2(*i*) changes to H level at time t1, then maintains H level for two horizontal periods, and changes to L level at time t4 earlier than time t5 by the offset time.

The period from time t1 to t2 is the initialization/compensation period Tic of the pixel circuit Pix(i, j). During the initialization/compensation period Tic, as illustrated in FIG. 16, the subsequent light emission control signal EM(i+X) and the first scanning signal SC1(*i*) are at L level, and the corresponding light emission control signal EM(i) and the second scanning signal SC2(*i*) are at H level. Therefore, as illustrated in FIG. 17A, the first light emission control transistor T5 and the write control transistor T1 are in OFF state, and the second light emission control transistor T6, the reference voltage supply control transistor T3, and the initialization transistor T2 are in ON state. As a result, the reference voltage Vref is applied to the first electrode of the first capacitor C1, and the initialization voltage Vini is applied to the second electrode of the second capacitor C2. In the light emission period Te before time t1, the first light emission control transistor T5 is in ON state, and the voltage across the second capacitor C2 is zero. Therefore, when the initialization/compensation period Tic is started at time t1, the holding voltage of the first capacitor C1, that is, the gate-source voltage Vgs of the drive transistor T4 temporarily becomes a value larger than the threshold voltage Vth of the drive transistor T4, and the drive transistor T4 becomes in ON state. Therefore, thereafter, the accumulated charge of the first capacitor C1 is discharged via the reference voltage supply control transistor T3, the second light emission control transistor T6, and the drive transistor T4. In response to this discharge, when the holding voltage of the first capacitor C1, that is, the gate-source voltage of the drive transistor T4 decreases to the threshold voltage Vth of the drive transistor T4, the drive transistor T4 goes into OFF state. By such an operation in the initialization/compensation period Tic, a voltage equal to the threshold voltage Vth of the drive transistor T4 is held in the first capacitor C1. Note that the anode electrode of the organic EL element OL is initialized by the initialization voltage Vini supplied via the initialization transistor T2 in the initialization/compensation period Tic.

The period from time t5 to t6 is the write period Tw of the pixel circuit Pix(i, j). During this write period, as illustrated in FIG. 16, the second scanning signal SC2(*i*) is at L level, and the subsequent light emission control signal EM(i+X), the corresponding light emission control signal EM(i), and the first scanning signal SC1(*i*) are at H level. Therefore, as illustrated in FIG. 17B, the first light emission control transistor T5, the second light emission control transistor T6, and the initialization transistor T2 are in OFF state, and the write control transistor T1 and the reference voltage supply control transistor T3 are in ON state. As a result, in the write period Tw, instead of the initialization voltage Vini, the voltage of the data signal line Dj (the voltage of the data signal D(j)) is applied to the second electrode of the second capacitor C2. In the write period TW, as in the initialization/compensation period Tic, the reference voltage Vref is still applied to the first electrode of the first capacitor C1. Immediately before the write period Tw, both the first light emission control transistor T5 and the second light emission control transistor T6 are in OFF state, and a voltage equal to the threshold voltage Vth of the drive transistor T4 is held in the first capacitor C1. Therefore, the voltage (source voltage) Vs of the source terminal of the drive transistor T4 is Vref-Vth. Therefore, in the present embodiment, as in the first embodiment, Vgs of the gate-source voltage of the drive transistor T4 immediately after the write period Tw is represented by the above equation (3).

Thereafter, the corresponding light emission control signal EM(i) changes from H level to L level at time t7, then furthermore, the subsequent light emission control signal EM(i) also changes from H level to the L level at time t8, and after time t8, the light emission period Te of the pixel circuit Pix(i, j) is reached. The light emission period Te continues until the corresponding light emission control signal EM(i) changes to H level in the next frame period. During the light emission period Te, as illustrated in FIG. 17C, the write control transistor T1, the initialization transistor T2, and the reference voltage supply control transistor T3 are in OFF state, and the first light emission control transistor T5 and the second light emission control transistor T6 are in ON state. Therefore, in the light emission period Te, a current I1 of an amount corresponding to the voltage held in the first capacitor C1, that is, the gate-source voltage Vgs of the drive transistor T4 flows from the high-voltage power supply line ELVDD to the low-voltage power supply line ELVSS via the second light emission control transistor T6, the drive transistor T4, the first light emission control transistor T5, and the organic EL element OL.

Note that the first light emission control transistor T5 changes to ON state at time t7, and thus, the source terminal of the drive transistor T4 to which the second electrode of the first capacitor C1 is connected is short-circuited to the anode electrode of the organic EL element OL. However, since the reference voltage supply control transistor T3 is changed to OFF state at time t7, the node including the first electrode of the first capacitor C1 becomes the floating state. Therefore, even when the first light emission control transistor T5 is changed to ON state at time t7, the holding voltage of the first capacitor C1, that is, the gate-source voltage Vgs of the drive transistor T4 does not change. Therefore, in the present embodiment, as in the first embodiment, in the light emission period Te, the gate-source voltage Vgs of the drive transistor T4 is represented by the above equation (3), and the current I1 flowing as the drive current through the organic EL element OL is represented by the above equation (6). From this equation (6), the drive current I1 does not depend on the threshold voltage Vth. Therefore, in the light emission period Te, the organic EL element OL emits light with luminance corresponding to the data voltage Vdata which is the voltage of the data signal D(j) regardless of the threshold voltage Vth of the drive transistor T4.

<3.4 Effects>

In the present embodiment as described above, unlike the known organic EL display device using the internal compensation type pixel circuit based on diode connection, as illustrated in FIG. 16, the initialization/compensation period Tic for performing threshold compensation and the write period Tw for performing data writing are separated in the pixel circuit Pix(i, j), so that the same effects as those of the first embodiment can be obtained.

In the present embodiment, as in the second embodiment, the first light emission control transistor T5 and the second light emission control transistor T6 in the pixel circuits Pix(1,1) to Pix(n, m) are controlled by one type of light emission control signals EM(1) to EM(n+X) (see FIGS. 14 and 15). In addition, the P-channel transistors are used as the first light emission control transistor T5 and the second light emission control transistor T6, and the reference voltage supply control transistor T3 is also controlled by the light emission control signal EM(i). Therefore, there is no need for the third scanning signal lines SC31 to SC3$n$ used in the first and second embodiments. As described above, in the present embodiment, since the types of the light emission control lines disposed in the display portion 11 are reduced from two types to one type, and the third scanning signal lines SC31 to SC3$n$ are unnecessary. Therefore, the configuration of the wiring in the display portion 11 and the scanning side drive circuit 40 is further simplified, and the layout design of the pixel circuit 17 and peripheral circuits of the pixel circuit 17 is facilitated.

<3.5 Modification of Third Embodiment>

In the third embodiment, as in the modification of the first embodiment (see FIGS. 6 and 7), in order to maintain high display quality in high-speed driving, the configuration can be changed such that the data write operation is performed in the write periods Tw over a plurality of horizontal periods. Hereinafter, an organic EL display device having such a modified configuration will be described as a modification of the third embodiment.

An overall configuration of a display device and a configuration of a pixel circuit in the present modification are basically the same as in the third embodiment, and the same or corresponding parts are denoted by the same reference characters and thus will not be described in detail (see FIGS. 14 and 15). In the present modification, the scanning side drive signals generated by the scanning side drive circuit 40, which are the first scanning signals SC1(1) to SC1($n$), the second scanning signals SC2(1) to SC2($n$), and the light emission control signals EM(1) to EM(n+X), are different from the scanning side drive signals generated by the scanning side drive circuit 40 in the third embodiment. Therefore, hereinafter, the present modification will be described focusing on the scanning side drive signals in the present modification and the operation of the pixel circuit Pix(i, j) based on the scanning side drive signals.

Figure 18:
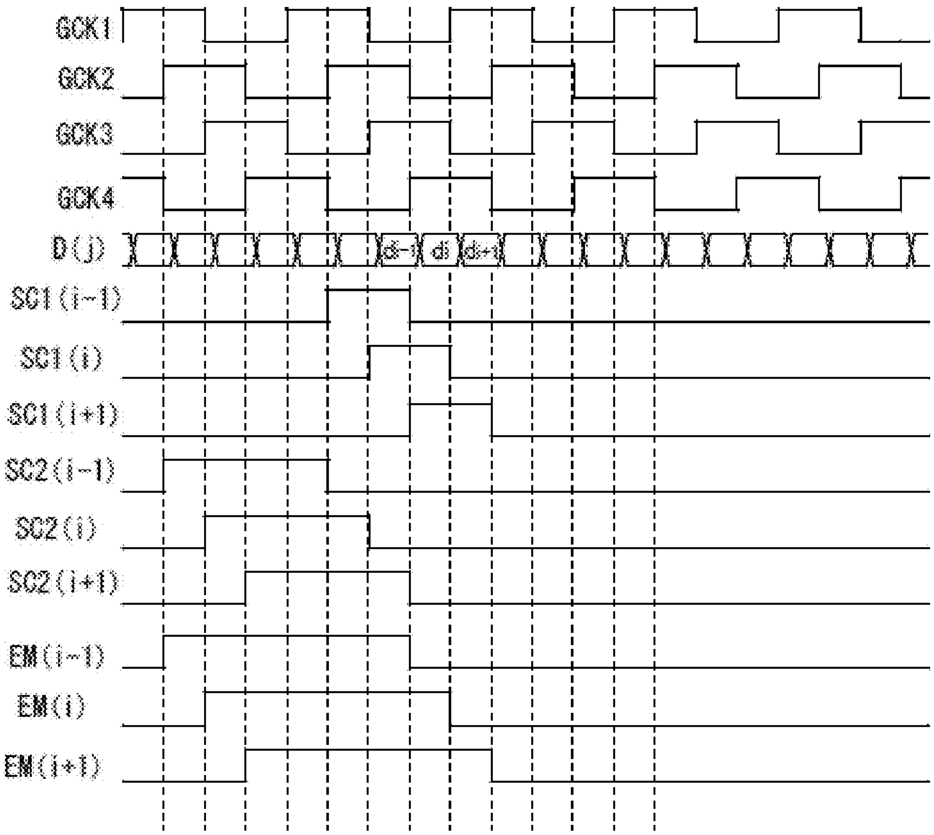
FIG. 18 is a timing chart for describing a schematic operation of a display device according to a modification of the third embodiment.

FIG. 18 is a timing chart for describing a schematic operation of the display device according to the present modification. FIG. 18 illustrates the scanning side drive signals together with the four-phase clock signal (first to fourth clock signals) GCK1 to GCK4 supplied from the display control circuit 20 to the scanning side drive circuit 40 and the data signal D(j) generated by the data side drive circuit 30. In the third embodiment, the four-phase clock signal GCK1 to GCK4 having a duty ratio of ¼ is generated by the display control circuit 20, whereas in the present modification, as illustrated in FIG. 18, the four-phase clock signal GCK1 to GCK4 having a duty ratio of ½ is generated by the display control circuit 20 and supplied to the scanning side drive circuit 40 as a part of the scanning side control signal Scs.

In the present modification, based on such a four-phase clock signal (first to fourth clock signals) GCK1 to GCK4, the scanning side drive circuit 40 generates scanning side drive signals, that is, the first scanning signals SC1(1) to SC1($n$), the second scanning signals SC2(1) to SC2($n$), and the light emission control signals EM(1) to EM(n+X) as illustrated in FIG. 18. As illustrated in FIG. 18, the length of the period of H level of the first scanning signal SC1($k$), that is, the selection period of the first scanning signal line SC1$k$ is approximately twice the length of the selection period of the first scanning signal line SC1$k$ in the third embodiment (k=1 to n). Therefore, the write period Tw in the present modification is twice as long as the write period Tw in the third embodiment. Note that the data signal D(j) in the present modification changes similarly to the data signal D(j) in the first embodiment, and its signal value is switched for each horizontal period (j=1 to m) (see FIG. 18).

Figure 19:
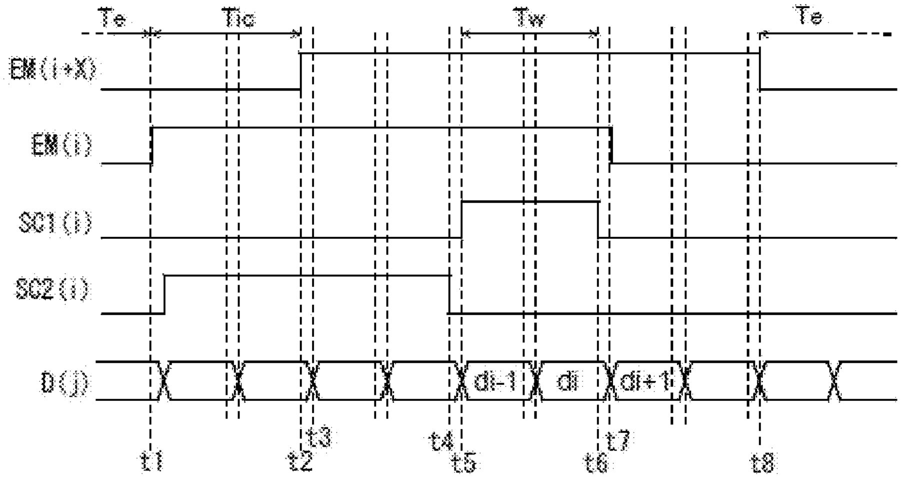
FIG. 19 is a timing chart for describing an operation of the pixel circuit in the modification of the third embodiment.
Figure 20:
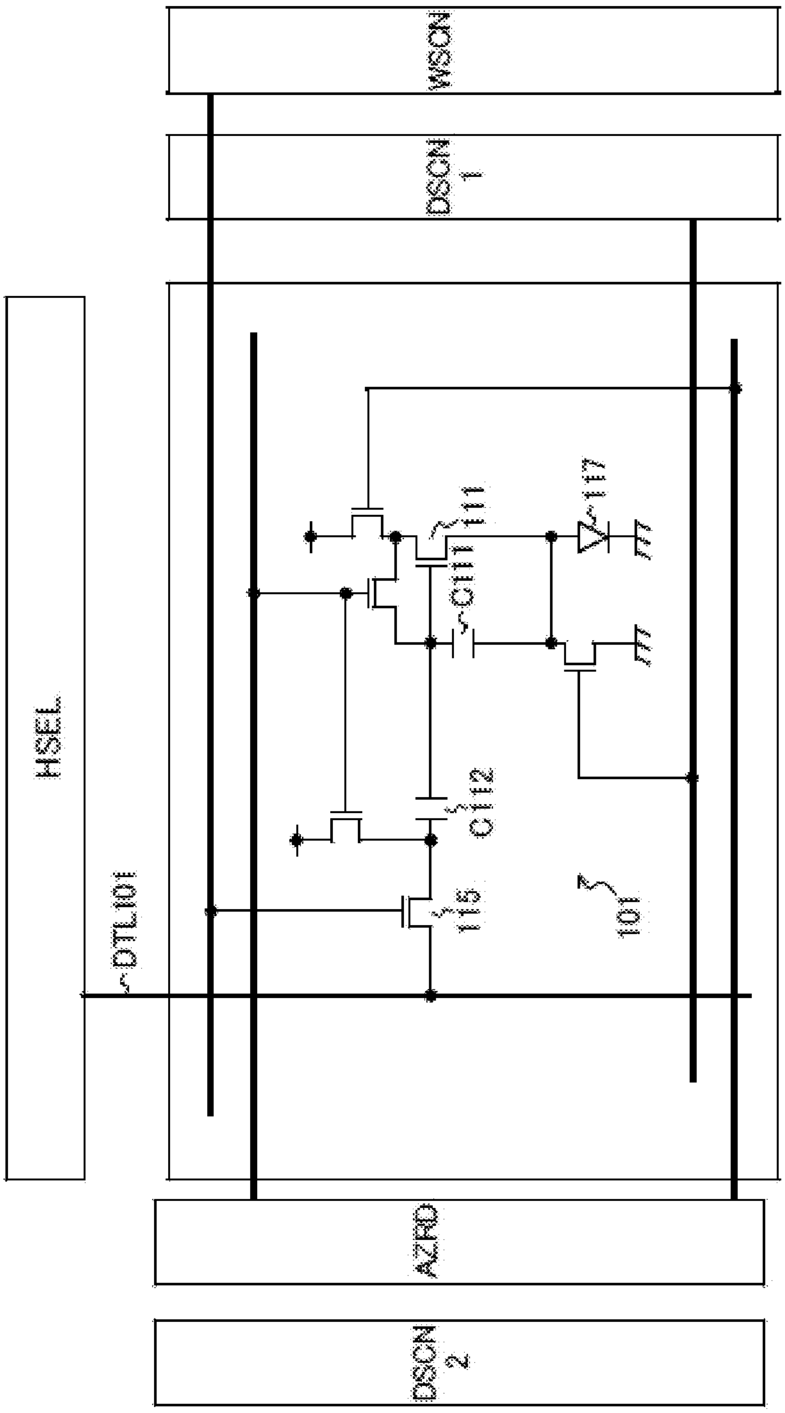
FIG. 20 Prior Art
FIG. 20 is a circuit diagram illustrating a configuration of a known example of a pixel circuit in an organic EL display device of an internal compensation system.

FIG. 19 is a timing chart for describing the operation of the pixel circuit Pix(i, j) in the i-th row and the j-th column in the present modification, and corresponds to an enlarged view of the drive signals EM(i), EM(i+X), SC1($i$), SC2($i$) supplied to the pixel circuit Pix(i, j) among the scanning side drive signals illustrated in FIG. 18, and the data signal D(j). Note that X=2 in the example illustrated in FIG. 19.

Times t1, t2, t3, t4, t5, t6, t7, and t8 in the timing chart of FIG. 19 correspond to times t1, t2, t3, t4, t5, t6, t7, and t8 in the timing chart of FIG. 16, respectively. The period from time t1 to t2 in the present modification is the initialization/compensation period Tic of the pixel circuit Pix(i, j) in FIG. 15, similarly to the period from time t1 to t2 in the third embodiment. The ON/OFF states of the transistors T1 to T3, T5, and T6 in the pixel circuit Pix(i, j) in the initialization/compensation period Tic are as illustrated in FIG. 17A. Therefore, in the present modification, the pixel circuit Pix(i, j) operates similarly to the third embodiment in the initialization/compensation period Tic. However, in the present modification, the length of the initialization/compensation period Tic is approximately twice the length of the initialization/compensation period Tic in the third embodiment. Therefore, at the end time point t2 of the initialization/compensation period Tic, the threshold voltage Vth of the drive transistor T4 is more accurately held in the first capacitor C1.

The period from time t5 to t6 in the present modification is the write period Tw of the pixel circuit Pix(i, j) in FIG. 15, similarly to the period from time t5 to t6 in the third embodiment. The ON/OFF states of the transistors T1 to T3, T5, and T6 in the pixel circuit Pix(i, j) in the write period Tw are as illustrated in FIG. 17B. Therefore, in the present modification, the pixel circuit Pix(i, j) also performs the data write operation in the write period Tw as in the third embodiment. However, in the present modification, the length of the write period Tw is approximately twice the length of the write period Tw in the third embodiment. On the other hand, as illustrated in FIG. 19, the data signal D(j) changes similarly to the data signal D(j) in the third embodiment, and its signal value is switched for each horizontal period (see FIG. 16). Therefore, to the pixel circuit Pix(i, j) of the i-th row and the j-th column, in the first half of the write period Tw having a length of approximately two horizontal periods, a voltage di−1 of the data signal D(j) to be written as the data voltage to the pixel circuit Pix(i−1, j) in the (i−1)th row and the j-th column is supplied, and in the second half of the write period Tw, a voltage di of the data signal D(j) to be written as the data voltage to the pixel circuit Pix(i, j) in the i-th row and the j-th column is supplied. As a result, in the present modification, as in the modification of the first embodiment, a shortage of charge in the write period Tw of the first capacitor C1 that determines the gate-source voltage of the drive transistor T4 can be resolved, and the data voltage di to be written to Pix(i, j) can be more accurately written.

As illustrated in FIG. 19, in the present modification, as in the third embodiment (see FIG. 16), the first scanning signal SC1(*i*) changes from H level to L level at time t6, the corresponding light emission control signal EM(i) changes from H level to L level at time t7, and then, the subsequent light emission control signal EM(i+X) changes from H level to L level at time t8. Therefore, the period after time t8 is the light emission period Te of the pixel circuit Pix(i, j) in FIG. 15, and the light emission period Te continues until the corresponding light emission control signal EM(i) changes from L level to H level in the next frame period. The ON/OFF states of the transistors T1 to T3, T5, and T6 in the pixel circuit Pix(i, j) in the light emission period Te are as illustrated in FIG. 17C similarly to the third embodiment. Therefore, similarly to the third embodiment, the drive current I1 represented by the above equation (6) based on the voltage held in the first capacitor C1 at the end time point t6 of the write period Tw flows from the high-voltage power supply line ELVDD to the low-voltage power supply line ELVSS via the second light emission control transistor T6, the drive transistor T4, the first light emission control transistor T5, and the organic EL element OL.

The display device according to the present modification including the pixel circuits Pix(i, j) (i=1 to n, j=1 to m) operating as described above can reliably write an accurate data voltage in each pixel circuit Pix(i, j) without lowering a driving frequency, as compared with the third embodiment. As a result, even when high-speed driving is performed, high display quality can be reliably maintained while appropriately performing threshold compensation of the drive transistor T4.

4. Other Modifications

The present disclosure is not limited to the above embodiments and the above modifications, and various modifications can be made without departing from the scope of the present disclosure. For example, the following modifications are conceivable.

The transistors T1 to T3, T5, and T6 included in the pixel circuit 15 in the first embodiment, the transistors T1 to T3 and T5 to T7 included in the pixel circuit 16 in the second embodiment, and the transistors T1 to T3 included in the pixel circuit 17 in the third embodiment are all N-channel transistors, but P-channel transistors such as, for example, LTPS-TFTs may be used for some or all of these transistors. In the pixel circuit 17 in the third embodiment, as illustrated in FIG. 15, the first light emission control transistor T5 and the second light emission control transistor T6 are P-channel transistors, and the other transistors T1 to T4 are N-channel transistors. However, more generally, conductivity types of the first light emission control transistor T5 and the second light emission control transistor T6 as switching elements are only required to be different from a conductivity type of the reference voltage supply control transistor T3 as a switching element.

In each of the above embodiments, the scanning side drive circuit 40 is configured to operate with the four-phase clock signal including the first to fourth clock signals GCK1 to GCK4 (see FIGS. 2, 6, etc.), but may be configured to operate with two-phase or three-phase clock signal, or may be configured to operate with multi-phase clock signal of five or more phases.

Any combination among the first to third embodiments and modifications thereof may be used within a range not contradictory to the gist of the present disclosure nor contradictory to the technology.

In the above, the embodiments and the modification of the embodiments have been described by taking the organic EL display device as an example, but the present disclosure is not limited to the organic EL display device, and can be applied to any display device of an internal compensation system using a display element driven by current. The display element usable here is a display element whose luminance, transmittance, or the like is controlled by current, and for example, in addition to an organic EL element, that is, an organic light emitting diode (OLED), an inorganic light emitting diode, a quantum dot light emitting diode (QLED), or the like can be used.

DESCRIPTION OF REFERENCE CHARACTERS

- 10, 10*b*, 10*c*: Organic EL Display Device
- 11: Display Portion
- 15, 16, 17: Pixel Circuit
- 20: display control circuit
- 30: Data Side Drive Circuit (Data Signal Line Drive Circuit)
- 40: Scanning Side Drive Circuit (Scanning Signal Line Drive/Light Emission Control Circuit)
- Pix(i, j): Pixel Circuit (i=1 to n, j=1 to m)
- Dj: Data Signal Line (j=1 to m)
- SC1*i*: First Scanning Signal Line (i=1 to n)
- SC2*i*: Second Scanning Signal Line (i=1 to n)
- SC3*i*: Third Scanning Signal Line (i=1 to n)
- EM1*i*: First Light Emission Control Line (i=1 to n)
- EM2*i*: Second Light Emission Control Line (i=1 to n)
- EMi: Light Emission Control Line (i=1 to n+X, X is positive integer)
- ELVDD: High-Voltage Power Supply Line, High-Level Power Supply Voltage
- ELVSS: Low-Voltage Power Supply Line, Low-Level Power Supply Voltage
- Lini: Initialization Voltage Line
- Lref: Reference Voltage Line
- Vini: Initialization Voltage
- Vref: Reference Voltage
- OL: Organic EL Element (Display Element)
- C1: First Capacitor
- C2: Second Capacitor
- T1: Write Control Transistor (Write Control Switching Element)
- T2: Initialization Transistor (Initialization Switching Element)
- T3: Reference Voltage Supply Control Transistor (Reference Voltage Supply Control Switching Element)
- T4: Drive Transistor
- T5: First Light Emission Control Transistor (First Light Emission Control Switching Element)
- T6: Second Light Emission Control Transistor (Second Light Emission Control Switching Element)
- T7: Current Supply Control Transistor (Current Supply Control Switching Element)

The invention claimed is:

1. A display device comprising:

a display portion including a plurality of pixel circuits, a high-voltage power supply line, a low-voltage power supply line, an initialization voltage line for supplying a predetermined initialization voltage, and a reference voltage line for supplying a predetermined reference voltage; and a drive circuit configured to drive the plurality of pixel circuits, wherein each of the pixel circuits includes a display element driven by a current, a drive transistor of an N-channel type, a write control switching element, an initialization switching element, a reference voltage supply control switching element, a first light emission control switching element, a second light emission control switching element, a first capacitor, and a second capacitor, the drive transistor has a drain terminal connected to the high-voltage power supply line via the second light emission control switching element, a gate terminal connected to the reference voltage line via the reference voltage supply control switching element, and a source terminal connected to the display element via the first light emission control switching element, the display element has a first terminal connected to the source terminal of the drive transistor via the first light emission control switching element and connected to the initialization voltage line via the initialization switching element, and a second terminal connected to the low-voltage power supply line, the first capacitor has a first electrode connected to the gate terminal of the drive transistor and a second electrode connected to the source terminal of the drive transistor, the second capacitor has a first electrode connected to the source terminal of the drive transistor, and a second electrode connected to the first terminal of the display element and configured to receive a data voltage to be written to the pixel circuit via the write control switching element, each of the pixel circuits is provided with an initialization period, a compensation period, a write period, and a light emission period, and the drive circuit controls ON and OFF of the write control switching element, the initialization switching element, the reference voltage supply control switching element, the first light emission control switching element, and the second light emission control switching element such that in each of the plurality of pixel circuits, in the initialization period, the first capacitor and the second capacitor are initialized such that a voltage for bringing the drive transistor to ON state is held in the first capacitor, in the compensation period, the voltage held in the first capacitor by initialization changes to a threshold voltage of the drive transistor, in the write period, the reference voltage is applied to the first electrode of the first capacitor in which the threshold voltage is held and the data voltage is applied to the second electrode of the second capacitor, so that a voltage corresponding to the data voltage is subjected to threshold compensation of the drive transistor and written to the first capacitor, and in the light emission period, a drive current corresponding to the voltage written to and held in the first capacitor is supplied to the display element.

2. The display device according to claim 1, wherein the drive circuit drives the plurality of pixel circuits such that the write period for each of the pixel circuits partially overlaps with a write period for at least one other pixel circuit in which writing of a data voltage is started before the write period for the each of the pixel circuits.

3. The display device according to claim 1, wherein the display portion further includes a plurality of data signal lines, a plurality of first scanning signal lines, a plurality of second scanning signal lines, a plurality of third scanning signal lines, a plurality of first light emission control lines, and a plurality of second light emission control lines, the write control switching element has a control terminal connected to one first scanning signal line of the plurality of first scanning signal lines, the initialization switching element has a control terminal connected to one second scanning signal line of the plurality of second scanning signal lines, the reference voltage supply control switching element has a control terminal connected to one third scanning signal line of the plurality of third scanning signal lines, the first light emission control switching element has a control terminal connected to one first light emission control line of the plurality of first light emission control lines, the second light emission control switching element has a control terminal connected to one second light emission control line of the plurality of second light emission control lines, the second electrode of the second capacitor is connected to one data signal line of the plurality of data signal lines via the write control switching element, and the drive circuit drives the plurality of first scanning signal lines, the plurality of second scanning signal lines, the plurality of third scanning signal lines, the plurality of first light emission control lines, and the plurality of second light emission control lines, and drives the plurality of data signal lines in conjunction with driving of the plurality of first scanning signal lines such that in each of the pixel circuits, in the initialization period, the write control switching element and the second light emission control switching element are in OFF state, and the initialization switching element, the first light emission control switching element, and the reference voltage supply control switching element are in ON state, in the compensation period, the write control switching element and the first light emission control switching element are in OFF state, and the initialization switching element, the reference voltage supply control switching element, and the second light emission control switching element are in ON state, in the write period, the initialization switching element, the first light emission control switching element, and the second light emission control switching element are in OFF state, and the write control switching element and the reference voltage supply control switching element are in ON state, and in the light emission period, the write control switching element, the initialization switching element, and the reference voltage supply control switching element are in OFF state, and the first light emission control switching element and the second light emission control switching element are in ON state.

4. The display device according to claim 1, wherein each of the pixel circuits further includes a current supply control switching element, the display portion further includes a plurality of data signal lines, a plurality of first scanning signal lines, a plurality of second scanning signal lines, a plurality of third scanning signal lines, and a plurality of light emission control lines, the write control switching element has a control terminal connected to one first scanning signal line of the plurality of first scanning signal lines, the initialization switching element has a control terminal connected to one second scanning signal line of the plurality of second scanning signal lines, the current supply control switching element has a control terminal connected to the one second scanning signal line, the reference voltage supply control switching element has a control terminal connected to one third scanning signal line of the plurality of third scanning signal lines, the second light emission control switching element has a control terminal connected to one light emission control line of the plurality of light emission control lines, the first light emission control switching element has a control terminal connected to another light emission control line of the plurality of light emission control lines, the another light emission control line transmitting a signal having a phase delayed from a phase of a signal transmitted by the one light emission control line, the second electrode of the second capacitor is connected to one data signal line of the plurality of data signal lines via the write control switching element, the drain terminal of the drive transistor is connected to the reference voltage line via the current supply control switching element, and the drive circuit drives the plurality of first scanning signal lines, the plurality of second scanning signal lines, the plurality of third scanning signal lines, and the plurality of light emission control lines and drives the plurality of data signal lines in conjunction with driving of the plurality of first scanning signal lines such that in each of the pixel circuits, in the initialization period, the write control switching element, the initialization switching element, the second light emission control switching element, and the current supply control switching element are in OFF state, and the first light emission control switching element and the reference voltage supply control switching element are in ON state, in the compensation period, the write control switching element, the first light emission control switching element, and the second light emission control switching element are in OFF state, and the initialization switching element, the reference voltage supply control switching element, and the current supply control switching element are in ON state, in the write period, the initialization switching element, the first light emission control switching element, the second light emission control switching element, and the current supply control switching element are in OFF state, and the write control switching element and the reference voltage supply control switching element are in ON state, and in the light emission period, the write control switching element, the initialization switching element, the reference voltage supply control switching element, and the current supply control switching element are in OFF state, and the first light emission control switching element and the second light emission control switching element are in ON state.

5. The display device according to claim 1, wherein the display portion further includes a plurality of data signal lines, a plurality of first scanning signal lines, a plurality of second scanning signal lines, and a plurality of light emission control lines, the reference voltage supply control switching element is an N-channel transistor or a P-channel transistor, and both the first light emission control switching element and the second light emission control switching element are transistors having conductivity types different from a conductivity type of the reference voltage supply control switching element, the write control switching element has a control terminal connected to one first scanning signal line of the plurality of first scanning signal lines, the initialization switching element has a control terminal connected to one second scanning signal line of the plurality of second scanning signal lines, the reference voltage supply control switching element has a control terminal connected to one light emission control line of the plurality of light emission control lines, the first light emission control switching element has a control terminal connected to the one light emission control line, the second light emission control switching element has a control terminal connected to another light emission control line of the plurality of light emission control lines, the another light emission control line transmitting a signal having a phase delayed from a phase of a signal transmitted by the one light emission control line, the second electrode of the second capacitor is connected to one data signal line of the plurality of data signal lines via the write control switching element, and the drive circuit drives the plurality of first scanning signal lines, the plurality of second scanning signal lines, and the plurality of light emission control lines and drives the plurality of data signal lines in conjunction with driving of the plurality of first scanning signal lines such that in each of the pixel circuits, the initialization period and the compensation period are integrated as an initialization/compensation period, and in the initialization/compensation period, the write control switching element and the first light emission control switching element are in OFF state, and the initialization switching element, the second light emission control switching element, and the reference voltage supply control switching element are in ON state, in the write period, the initialization switching element, the first light emission control switching element, and the second light emission control switching element are in OFF state, and the write control switching element and the reference voltage supply control switching element are in ON state, and in the light emission period, the write control switching element, the initialization switching element, and the reference voltage supply control switching element are in OFF state, and the first light emission control switching element and the second light emission control switching element are in ON state.

6. A pixel circuit included in a display portion provided in a display device, the pixel circuit comprising:

a display element driven by a current;

a drive transistor of an N-channel type;

a write control switching element;

an initialization switching element;

a reference voltage supply control switching element;

a first light emission control switching element;

a second light emission control switching element;

a first capacitor; and a second capacitor, wherein the display portion further includes a high-voltage power supply line, a low-voltage power supply line, an initialization voltage line for supplying a predetermined initialization voltage, and a reference voltage line for supplying a predetermined reference voltage, the drive transistor has a drain terminal connected to the high-voltage power supply line via the second light emission control switching element, a gate terminal connected to the reference voltage line via the reference voltage supply control switching element, and a source terminal connected to the display element via the first light emission control switching element, the display element has a first terminal connected to the source terminal of the drive transistor via the first light emission control switching element and connected to the initialization voltage line via the initialization switching element, and a second terminal connected to the low-voltage power supply line, the first capacitor has a first electrode connected to the gate terminal of the drive transistor and a second electrode connected to the source terminal of the drive transistor, and the second capacitor has a first electrode connected to the source terminal of the drive transistor, and a second electrode connected to the first terminal of the display element and configured to receive a data voltage to be written to the pixel circuit via the write control switching element.

7. The pixel circuit according to claim 6, wherein the display portion further includes a plurality of data signal lines, a plurality of first scanning signal lines, a plurality of second scanning signal lines, a plurality of third scanning signal lines, a plurality of first light emission control lines, and a plurality of second light emission control lines, the write control switching element has a control terminal connected to one first scanning signal line of the plurality of first scanning signal lines, the initialization switching element has a control terminal connected to one second scanning signal line of the plurality of second scanning signal lines, the reference voltage supply control switching element has a control terminal connected to one third scanning signal line of the plurality of third scanning signal lines, the first light emission control switching element has a control terminal connected to one first light emission control line of the plurality of first light emission control lines, the second light emission control switching element has a control terminal connected to one second light emission control line of the plurality of second light emission control lines, and the second electrode of the second capacitor is connected to one data signal line of the plurality of data signal lines via the write control switching element.

8. The pixel circuit according to claim 6, further comprising a current supply control switching element, wherein the display portion further includes a plurality of data signal lines, a plurality of first scanning signal lines, a plurality of second scanning signal lines, a plurality of third scanning signal lines, and a plurality of light emission control lines, the write control switching element has a control terminal connected to one first scanning signal line of the plurality of first scanning signal lines, the initialization switching element has a control terminal connected to one second scanning signal line of the plurality of second scanning signal lines, the current supply control switching element has a control terminal connected to the one second scanning signal line, the reference voltage supply control switching element has a control terminal connected to one third scanning signal line of the plurality of third scanning signal lines, the second light emission control switching element has a control terminal connected to one light emission control line of the plurality of light emission control lines, the first light emission control switching element has a control terminal connected to another light emission control line of the plurality of light emission control lines, the another light emission control line transmitting a signal having a phase delayed from a phase of a signal transmitted by the one light emission control line, the drain terminal of the drive transistor is connected to the reference voltage line via the current supply control switching element, and the second electrode of the second capacitor is connected to one data signal line of the plurality of data signal lines via the write control switching element.

9. The pixel circuit according to claim 6, wherein the display portion further includes a plurality of data signal lines, a plurality of first scanning signal lines, a plurality of second scanning signal lines, and a plurality of light emission control lines, the reference voltage supply control switching element is an N-channel transistor or a P-channel transistor, and both the first light emission control switching element and the second light emission control switching element are transistors having conductivity types different from a conductivity type of the reference voltage supply control switching element, the write control switching element has a control terminal connected to one first scanning signal line of the plurality of first scanning signal lines, the initialization switching element has a control terminal connected to one second scanning signal line of the plurality of second scanning signal lines, the reference voltage supply control switching element has a control terminal connected to one light emission control line of the plurality of light emission control lines, the first light emission control switching element has a control terminal connected to the one light emission control line, the second light emission control switching element has a control terminal connected to another light emission control line of the plurality of light emission control lines, the another light emission control line transmitting a signal having a phase delayed from a phase of a signal transmitted by the one light emission control line, and the second electrode of the second capacitor is connected to one data signal line of the plurality of data signal lines via the write control switching element.

10. The pixel circuit according to claim 6, wherein the drive transistor is a thin film transistor in which a channel layer is formed of an oxide semiconductor.

11. A method for driving a pixel circuit included in a display portion provided in a display device, wherein the pixel circuit includes a display element driven by a current, a drive transistor of an N-channel type, a write control switching element, an initialization switching element, a reference voltage supply control switching element, a first light emission control switching element, a second light emission control switching element, a first capacitor, and a second capacitor, the display portion further includes a high-voltage power supply line, a low-voltage power supply line, an initialization voltage line for supplying a predetermined initialization voltage, and a reference voltage line for supplying a predetermined reference voltage, the drive transistor has a drain terminal connected to the high-voltage power supply line via the second light emission control switching element, a gate terminal connected to the reference voltage line via the reference voltage supply control switching element, and a source terminal connected to the display element via the first light emission control switching element, the display element has a first terminal connected to the source terminal of the drive transistor via the first light emission control switching element and connected to the initialization voltage line via the initialization switching element, and a second terminal connected to the low-voltage power supply line, the first capacitor has a first electrode connected to the gate terminal of the drive transistor and a second electrode connected to the source terminal of the drive transistor, the second capacitor has a first electrode connected to the source terminal of the drive transistor, and a second electrode connected to the first terminal of the display element and configured to receive a data voltage to be written to the pixel circuit via the write control switching element, and the method comprises:

initializing the first capacitor and the second capacitor such that a voltage for bringing the drive transistor to ON state is held in the first capacitor;

performing a threshold detection by changing the voltage held in the first capacitor as a result of initializing the first capacitor and the second capacitor, to a threshold voltage of the drive transistor;

writing the data voltage to the first capacitor such that a voltage corresponding to the data voltage is subjected to threshold compensation of the drive transistor and held in the first capacitor by applying the reference voltage to the first electrode of the first capacitor in which the threshold voltage is held as a result of the threshold detection and applying the data voltage to the second electrode of the second capacitor; and performing a light emission by supplying a drive current corresponding to the voltage written to and held in the first capacitor as a result of writing the voltage corresponding to the data voltage, to the display element.

12. The method according to claim 11, wherein in writing the data voltage, the pixel circuit is driven such that a first period for writing the data voltage to the pixel circuit partially overlaps with a second period for writing another data voltage to at least one other pixel circuit in which writing of the another data voltage is started before the first period.

* * * * *